(12) United States Patent
Chang

(10) Patent No.: US 8,998,076 B2
(45) Date of Patent: Apr. 7, 2015

(54) ESTABLISHING CONNECTIONS AMONG ELECTRONIC DEVICES

(76) Inventor: Arthur Chang, Foster City, CA (US)

( * ) Notice: Subject to any disclaimer, the term of this patent is extended or adjusted under 35 U.S.C. 154(b) by 50 days.

(21) Appl. No.: 13/481,487

(22) Filed: May 25, 2012

(65) Prior Publication Data

US 2013/0134212 A1    May 30, 2013

Related U.S. Application Data

(60) Provisional application No. 61/492,961, filed on Jun. 3, 2011.

(51) Int. Cl.
| | | |
|---|---|---|
| G06F 17/00 | (2006.01) | |
| G06F 17/30 | (2006.01) | |
| G06F 11/07 | (2006.01) | |
| H04L 29/08 | (2006.01) | |

(52) U.S. Cl.
CPC ...... *G06F 17/30283* (2013.01); *G06F 11/0742* (2013.01); *G06F 11/0769* (2013.01); *G06F 11/0772* (2013.01); *H04L 67/34* (2013.01); *H04L 67/327* (2013.01)

(58) Field of Classification Search
CPC .......... G06F 17/30283; G06F 11/0742; G06F 11/0769; G06F 11/0772; H04L 67/327; H04L 67/34
USPC .............. 235/383, 375, 472.01; 455/564, 566
See application file for complete search history.

(56) References Cited

U.S. PATENT DOCUMENTS

| | | |
|---|---|---|
| 7,426,403 B2 | 9/2008 | Sundararajan et al. |
| 7,562,383 B2 | 7/2009 | Thione et al. |
| 7,643,789 B2 | 1/2010 | Fadell |
| 7,835,736 B2 | 11/2010 | Larocca |
| 7,962,137 B2 | 6/2011 | Coppinger et al. |
| 7,965,981 B2 | 6/2011 | Bloebaum et al. |
| 8,041,951 B2 | 10/2011 | Want et al. |
| 8,060,012 B2 | 11/2011 | Sklovsky et al. |
| 8,060,627 B2 | 11/2011 | Rosenblatt et al. |
| 2005/0198029 A1 | 9/2005 | Pohja et al. |
| 2006/0073788 A1 | 4/2006 | Halkka et al. |
| 2007/0287418 A1* | 12/2007 | Reddy ........................... 455/410 |

(Continued)

FOREIGN PATENT DOCUMENTS

| | | |
|---|---|---|
| DE | 102011086678 | 5/2012 |
| EP | 1832998 | 9/2007 |

OTHER PUBLICATIONS

Huang, Yo-Ping et al., "QR Code Data Type Encoding for Ubiquitous Information Transfer Across Different Platforms", Symposia and Workshops on Ubiquitous, Autonomic and Trusted Computing, IEEE Computer Society, 2009, pp. 292-297.

*Primary Examiner* — Sonji Johnson
(74) *Attorney, Agent, or Firm* — Raubvogel Law Office

(57) ABSTRACT

The present invention extends to methods, systems, and computer program products for establishing connections among electronic devices. Embodiments of the invention can use a context code, such as, for example, a QR code to facilitate electronic device networking. The connection process between electronic devices is automated. For example, upon snapping a picture, a communication application establishes connection between devices and also serves as a port between the connected devices. Networking code can be greatly simplified, permitting application developers to devote more resources to developing application code.

18 Claims, 15 Drawing Sheets

(56) References Cited

U.S. PATENT DOCUMENTS

| | | |
|---|---|---|
| 2008/0172340 A1 | 7/2008 | Karlsson |
| 2008/0207128 A1 | 8/2008 | Mikko |
| 2009/0125984 A1 | 5/2009 | Bilger et al. |
| 2009/0239467 A1 | 9/2009 | Gulin et al. |
| 2009/0247078 A1 | 10/2009 | Sklovsky et al. |
| 2009/0247080 A1 | 10/2009 | Falck |
| 2009/0300549 A1 | 12/2009 | Wang et al. |
| 2009/0327713 A1 | 12/2009 | Marin et al. |
| 2010/0012715 A1* | 1/2010 | Williams et al. ............... 235/375 |
| 2010/0078475 A1 | 4/2010 | Lin et al. |
| 2010/0081375 A1 | 4/2010 | Rosenblatt et al. |
| 2010/0082784 A1 | 4/2010 | Rosenblatt et al. |
| 2010/0190437 A1 | 7/2010 | Buhot |
| 2010/0197224 A1 | 8/2010 | Lahdenniemi et al. |
| 2010/0222000 A1 | 9/2010 | Sauer et al. |
| 2010/0272193 A1 | 10/2010 | Khan et al. |
| 2010/0288828 A1 | 11/2010 | Pradhan et al. |
| 2011/0065384 A1 | 3/2011 | Cader et al. |
| 2011/0072263 A1 | 3/2011 | Bishop et al. |
| 2011/0081860 A1 | 4/2011 | Brown et al. |
| 2011/0081923 A1 | 4/2011 | Forutanpour et al. |
| 2011/0165896 A1 | 7/2011 | Stromberg et al. |
| 2011/0202427 A1* | 8/2011 | Garcia Jurado Suarez et al. ............... 705/26.35 |
| 2011/0231884 A1 | 9/2011 | Shmueli et al. |
| 2011/0264527 A1 | 10/2011 | Fitzpatrick et al. |
| 2011/0266348 A1 | 11/2011 | Denniston |
| 2011/0270751 A1 | 11/2011 | Csinger et al. |
| 2011/0283334 A1 | 11/2011 | Choi et al. |
| 2012/0019367 A1 | 1/2012 | Roth et al. |
| 2012/0069772 A1 | 3/2012 | Byrne et al. |
| 2012/0144313 A1 | 6/2012 | Park et al. |

* cited by examiner

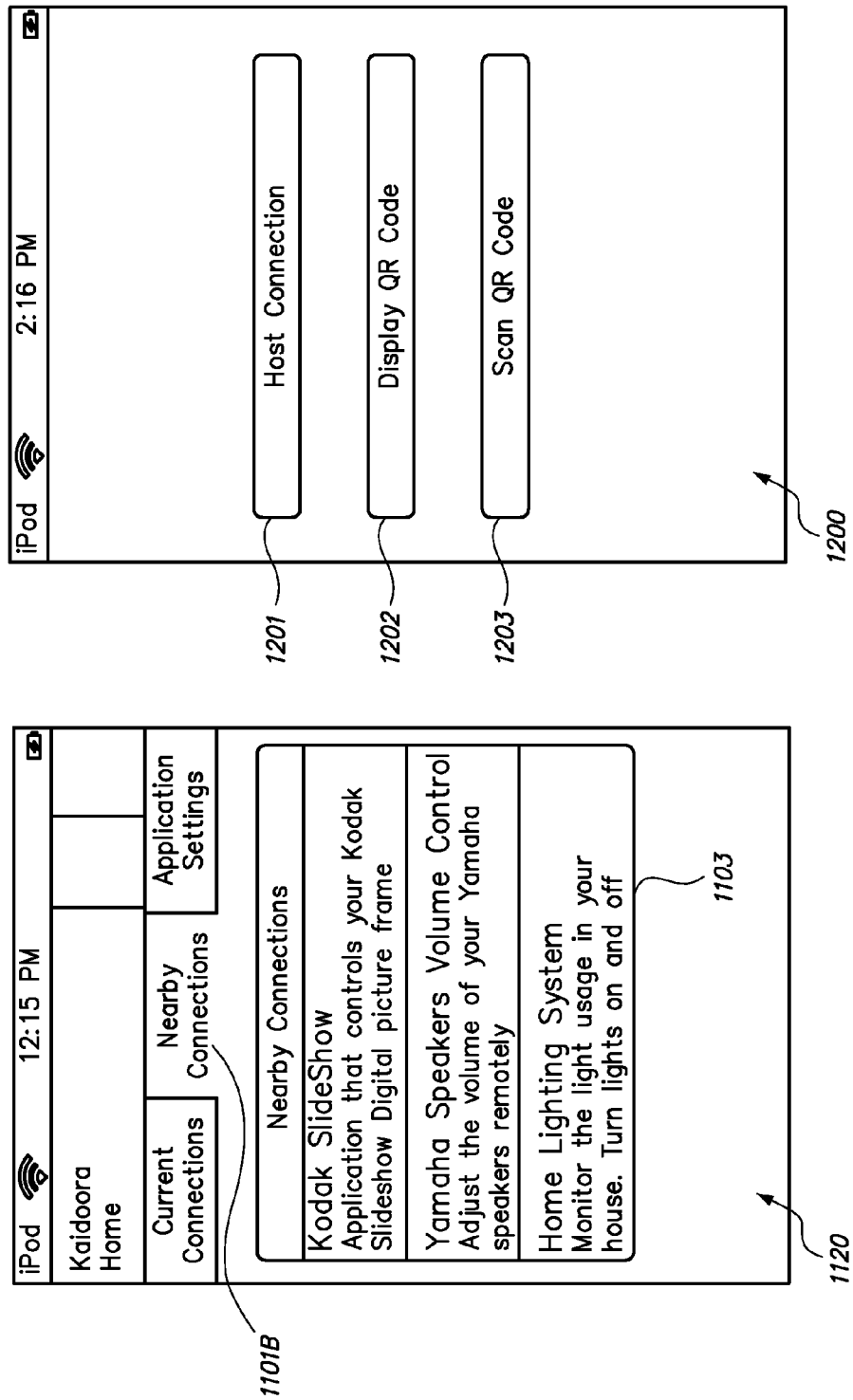

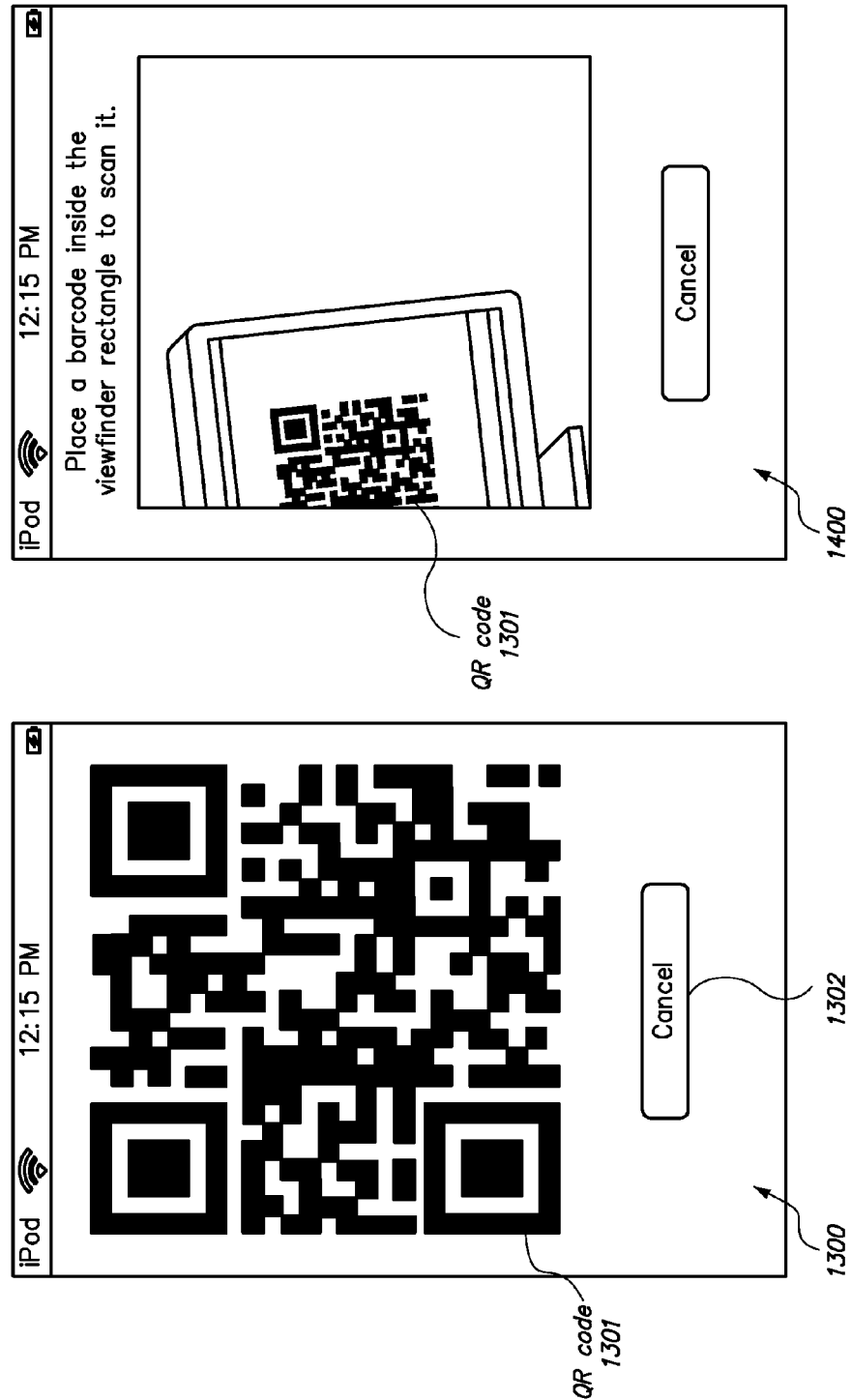

ESTABLISHING CONNECTIONS AMONG ELECTRONIC DEVICES

CROSS-REFERENCE TO RELATED APPLICATION

The present application claims priority from U.S. Provisional Application Ser. No. 61/492,961 for "Establishing Connections among Electronic Devices," filed Jun. 3, 2011, the disclosure of which is incorporated herein by reference in its entirety.

FIELD OF THE INVENTION

The present invention relates to computer networking, and more particularly to establishing connections among electronic devices.

BACKGROUND OF THE INVENTION

In the past, electronic devices have had a stigma of isolated operation. Each device was manufactured to be self-sustaining and able to achieve its own individual purpose without interacting with other devices. As technology has progressed, connectivity among devices has increased. Many different forms of connectivity have been developed, for performing various types of operations that involve two or more electronic devices. Such connectivity can be wired or wireless. For example, computers can be connected to one another via the Internet, printers can be connected to computers via USB cables or wirelessly, and the like.

Personal area networks such as Bluetooth provide a mechanism for establishing wireless connectivity between and among local electronic devices. Other, more wide-ranging wireless communications mechanisms include Wi-Fi, GSM, 3G, 4G, and the like.

In general, such wireless communications mechanisms require significant effort on the part of the user to establish and maintain a connection. For Bluetooth connections, a "pairing" procedure must be invoked before devices are able to talk to one another. In addition, some users have concerns about security of data being transmitted across wireless communications paths such as Bluetooth. Such limitations and requirements can act as a significant barrier to use and adoption of the technology.

Recently, many smartphones, tablets, laptop computers, netbook computers, and other devices have been introduced that provide cellular network connectivity, Bluetooth connectivity, WiFi, and the like, as well as providing onboard cameras. With the introduction of such mobile devices comes a need for them to interface with other electronic devices. However, existing mechanisms for establishing wireless connectivity among such devices are limited and burdensome.

SUMMARY

The present invention extends to methods, systems, and computer program products for establishing connections among electronic devices. In some embodiments, an application command is received from an application at an electronic device. The application command is related to establishing electronic device connectivity based on a context code (e.g., a two-dimensional bar code). The application command is translated into an equivalent set of one or more context code commands. The one or more context code commands are compatible with an operating system of the electronic device. The equivalent one or more context code commands are queued for use by a router service. The router service is configured to route context code commands to corresponding communication processing services. A context code command, selected from among the equivalent one or more context code commands, is dequeued to the router service. The router service routes the dequeued context code command to the appropriate corresponding communication processing service for processing. A processing status of processing the context code command is determined. The processing status is communicated back to the application.

More specifically, in at least one embodiment, a context code can be used to establish a connection between electronic devices. An input device at an electronic device is activated to capture a context code (e.g., a two-dimensional bar code). The context code stores encoded parameters for configuring a communication connection between electronic devices. The encoded parameters are decoded into decoded parameters.

A portion of the decoded parameters is used to establish a communication connection between the electronic device and another electronic device. Another portion of the decoded parameters is sent over the established communication connection to the other electronic device. Another portion of decoded parameters is for initializing the other electronic device into an appropriate state to operate in conjunction with the electronic device.

In at least one embodiment, an additional portion of the decoded parameters is used to obtain a user interface for interfacing with an application resident at the other electronic device. The user interface can be obtained from a platform server or from the other electronic device. A further portion of the decoded parameters is used to initialize the user interface to a compatible state with the application resident at the other electronic device.

In further embodiments, application components at electronic devices are synchronized so that both applications can establish network connectivity to one another using context codes. An application at an electronic device attempts to interact with a context code (e.g., a two-dimensional barcode) in a desired manner. The context code encodes parameters used for establishing network connectivity with other electronic devices.

If it is detected that the electronic device lacks at least one other component (e.g., a third party application or a communication application) for interacting with the context code in the desired manner, the electronic device prompts for installation of the at least one other component at the electronic device. The at least one other component is installed at the electronic device in response to the prompt. The installed at least one other component is utilized to interact with the context code in the desired manner.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIGS. 11A to 11C depict examples of user interface screens that can be presented at an electronic device to assist with making connections, according to one embodiment.

FIG. 12 depicts an example of a user interface screen that can be presented at an electronic device to assist with selecting various communication options, according to one embodiment.

FIG. 13 depicts an example of a user interface screen displaying a QR code at an electronic device, according to one embodiment.

FIGS. 14A and 14B depict examples of user interfaces screens that can be presented at an electronic device to assist with capturing a QR code, according to one embodiment.

DETAILED DESCRIPTION OF THE EMBODIMENTS

System Architecture

Figure 1:
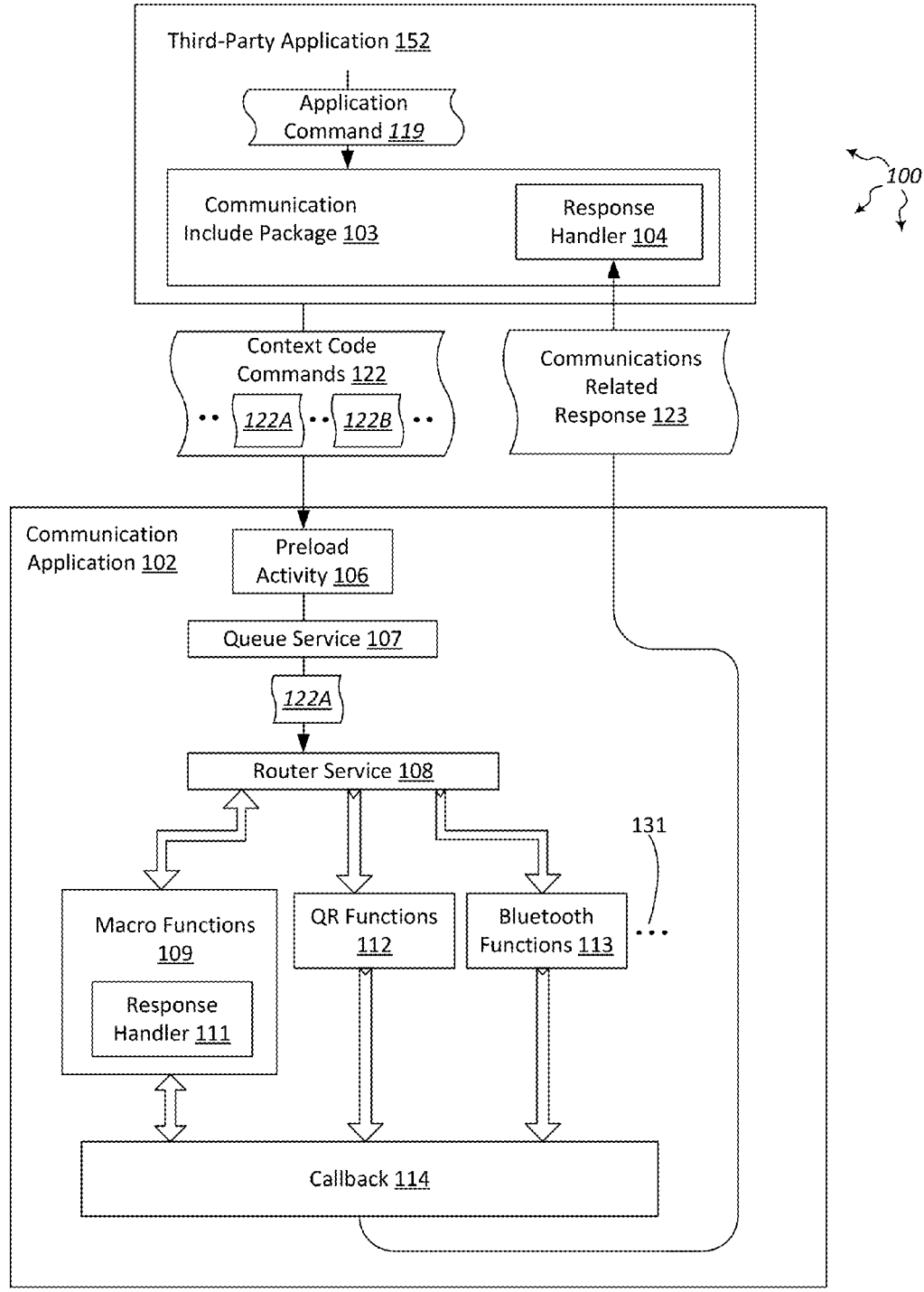
FIG. 1 depicts an example computer architecture for processing connection management data, according to one embodiment.

According to various embodiments, the present invention can be implemented on any electronic device configured to initiate and/or receive electronic communications. Such an electronic device may be, for example, a cellular telephone, smartphone, desktop computer, laptop computer, personal digital assistant (PDA), music player, handheld computer, tablet computer, kiosk, game system, television, or the like. Such a device may initiate and/or receive electronic communications in any of a number of modes, such as voice, text, email, instant message, chat, video chat, SMS, MMS, and the like. Communications may be implemented via any suitable communications network and according to any known communications protocol. Examples include the Internet, cellular telephone networks, EDGE, 3G, 4G, long term evolution (LTE), Session Initiation Protocol (SIP), Short Message Peer-to-Peer protocol (SMPP), SS7, WiFi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. Communications may be secured, if appropriate, using any known security techniques such as, for example, a Virtual Private Network (VPN). In one embodiment, the system of the present invention can use any appropriate security mechanism(s) to ensure that user information is kept private; such mechanism(s) can include for example, salts, hashes, and/or memCaches (memory caches), either singly or in any suitable combination. Such techniques are well known in the art.

Although the invention is described herein in connection with implementations for establishing connections between electronic devices, one skilled in the art will recognize that the techniques of the present invention can be implemented in other contexts, and indeed in any suitable device or service that enables electronic communication. Accordingly, the following description is intended to illustrate various embodiments of the invention by way of example, rather than to limit the scope of the claimed invention.

In at least one embodiment, the present invention is implemented as software running on a communication device. Such software can be in the form of an application (or "app") that can be downloaded (or otherwise obtained) and installed on the device. Alternatively, the functionality of the present invention can be included in software that is bundled with the device, such as operating system software, or delivered as a service to a device running a browser. In other embodiments, as described in more detail below, the system of the present invention can be implemented without any specialized software running on the communication device.

Electronic devices can be configured to perform a variety of different connection related activities, including implementing Bluetooth commands, ZigBee commands, capturing context codes, decoding context codes, accessing connection management data, and encoding context codes. Macro functions can group multiple different connection related activities together into a single command.

Embodiments of the invention include an electronic device platform, accessible via Application Program Interfaces (APIs), for connecting electronic devices to one another. A "context code" can be used to store data for managing connections between electronic devices. Electronic devices can access stored data from within context codes and use the stored data to connect with one another.

A context code can be represented in machine-readable code, such as, for example, a linear bar code or a two-dimensional bar code. For example, data for managing connections between electronic devices can be encoded in a Quick Response (QR) code. An electronic device can use an onboard camera to capture a photograph of the machine-readable code and decode connection management data encoded within the machine-readable code. The decoded connection management data can then be used to establish connectivity to other electronic devices.

Other mechanisms can also be used for representing a context code. In one embodiment, Near Field Communication (NFC) is used. In another embodiment, radio-frequency identification devices (RFIDs) can be used. In yet another embodiment, context codes can be broadcast over some wireless communications medium such as Wi-Fi, radio, or cellular receivable mode. An electronic device can detect the broadcast signal, record the message and decode it to obtain the context code.

Embodiments also include electronic devices retrieving connection management data (e.g., Bluetooth socket information) and encoding the connection management data into a context code, such as, for example, a QR code. The context code can then be made available to other electronic devices. For example, a QR code can be printed or displayed at display device for capture.

Processing Connection Management Data

FIG. 1 depicts an example computer architecture 100 for processing connection management data. As depicted, computer architecture 100 includes third-party application 152 and communication application 102. Third-party application 152 can be virtually any application, such as, for example, a multi-player game, a social networking application, a messaging application, etc. Communication include package 103 provides an interface for translating application commands into context code commands (e.g., intents or URL parameters) for an underlying operating system (e.g., Android or iOS) and vice versa. Generally, communication include package 103 can receive an application command, translate the application command into one or more context code commands, and send the one or more context code commands to communication application 102. Communication include package 103 can also receive responses form communication application 102 (e.g., as intents or URL parameters). Response handler 104 can translate the responses into application functions.

Communication application 102 includes preload activity 106, queue service 107, router service 108, macro functions 109, QR functions 112, and Bluetooth functions 113, and callback 114. Ellipsis 131 indicates that other communication functions can be connected to router service 108.

Generally, preload activity 106 can receive one or more context code commands 122 (e.g., intents or URL parameters) from third-party application 152. Preload activity 106 can queue the one or more context code commands 122 with queue service 107. Queuing incoming context code commands 122 can avoid disruptions due to code blocking.

As router service 108 is available, context code commands 122 can be dequeued and processed by router service 108. Router service 108 directs each context code command to an appropriate service. For example, router 108 can route QR related commands to QR functions 112, Bluetooth commands to Bluetooth functions 113, etc. Router 108 can route macro commands to macro functions 109, which then handles processing of each individual context code command within the macro command. Macro functions 109 includes response handler 111 that can determine how to proceed through a set of context code commands 122 based on response messages for previously processed context code commands 122.

Callback 114 can pass response messages to response handler 111 and response handler 104 as appropriate when context code commands 122 complete.

Figure 2:
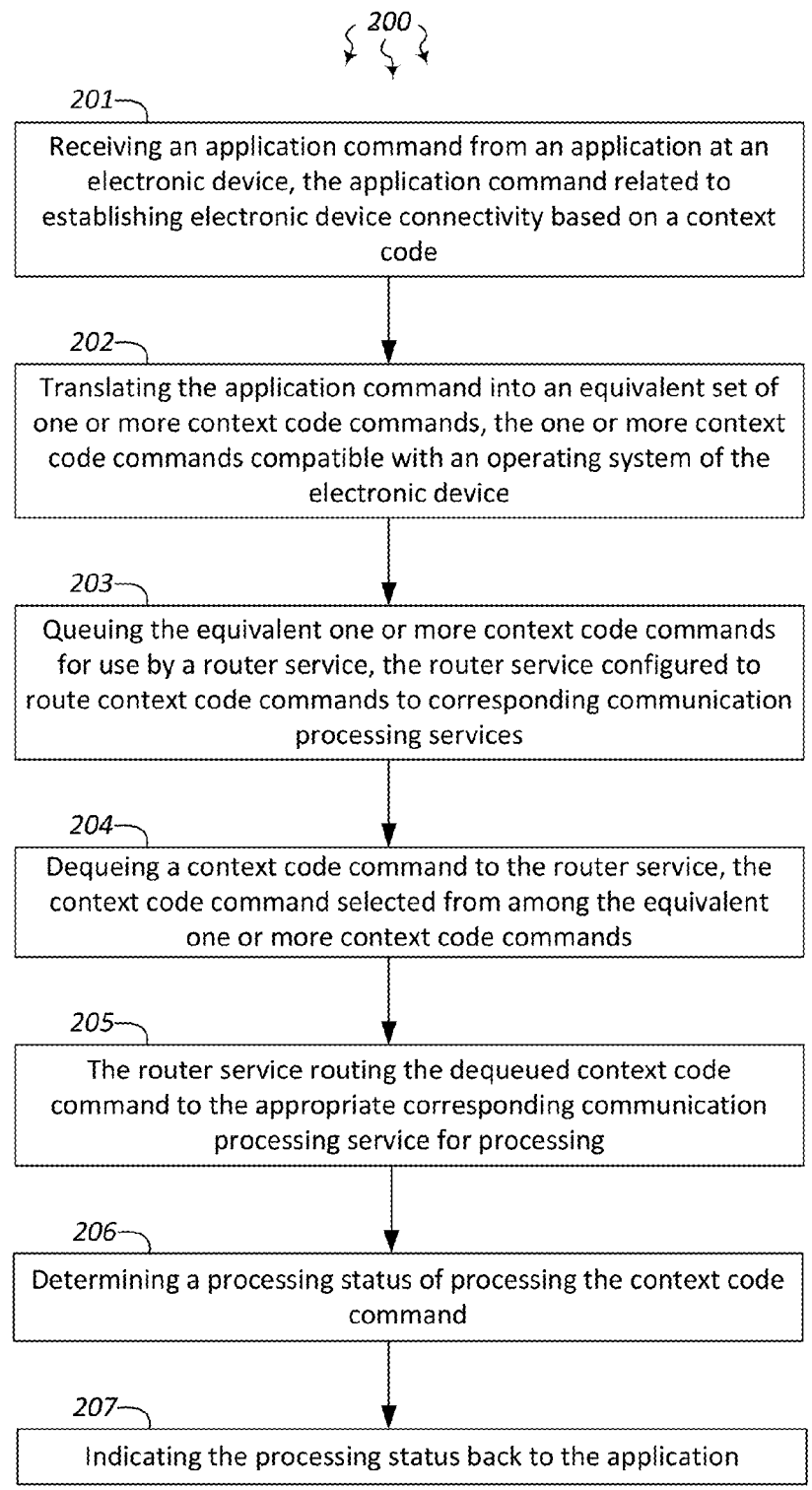
FIG. 2 depicts a flow chart of an example method for processing connection management data, according to one embodiment.

FIG. 2 depicts a flow chart of an example method 200 for processing connection management data. Method 200 will be described with respect to the components and data in computer architecture 100.

Method 200 includes receiving an application command from an application at the electronic device, the application command related to establishing electronic device connectivity based on a context code (201). For example, communication include package 103 can receive application command 119. Application command 119 can relate to establishing connectivity between electronic devices. For example, application command 119 can relate to a Bluetooth function, a ZigBee function, scanning a QR code, connecting electronic devices based on connection management data contained in QR code, creating a QR code, establishing pub/sub communications, read/write of external files, etc.

Application Command Format

In some embodiments, application commands and corresponding arguments are passed as JavaScript Object Notation (JSON) objects. For example, a command and arguments can be of a format similar to:

```
JSONObject JSONstring = new JSONObject( );
JSONstring.put("command", "Macro_BluetoothHost");
JSONstring.put("instanceId", 1234);
JSONstring.put("onSuccess", "com.thirdparty.app.success");
JSONstring.put("onSuccessKey", "8");
Intent intent = new Intent("com.example.router");
intent.putExtra("content", JSONstring.toString( ));
startActivity(intent);
```

This is an example of creating a Bluetooth connection as a Host. This command takes an instanceId argument as well as onSuccess callback parameters. The JSONObject is written as a String and placed as a "content" extra into the Intent call to communication application 102.

Each connection between a Host and a Client device can be assigned an instanceId. These instanceIds allow third-party applications to reference the appropriate connection channel id and direct communication application 102 towards a particular connected device.

Upon successful execution of a command, at least some of communication application 102's functions can return with an intent request. In at least one embodiment, this request comes in the form of "com.thirdparty.app.success" and can initiate an Activity. An example of this is the following:

```
public class ThirdPartySuccessHandler extends Activity{
    @Override
    protected void onCreate(Bundle savedInstanceState) {
        super.onCreate(savedInstanceState);
        Intent intent = getIntent( );
        Bundle bun = data.getExtras( );
        String content = (String) bun.get("content");
        JSONParser parser = new JSONParser( );
        JSONObject jsonin = null;
        try {
            jsonin = (JSONObject) parser.parse(content);
        } catch (ParseException e) {e.printStackTrace( );}
        ThirdPartyMain.response(intent);
        finish( );
    }
}
```

The Success Handler Activity can be registered with an AndroidManifest to receive incoming Intents. These intents can be formatted in a similar manner as the outgoing intents: a JSONObject can be written as a String and placed as a "content" extra, thus the "content" extra would be extracted and parsed into a JSONObject to retrieve the response data.

A success key can assist with marking incoming successful responses. When a communication related command is issued from a third-party application (e.g., 152), it may contain onSuccess and onSuccessKey callback parameters, which upon successful execution will return an Intent with "onSuccess" as the address and "onSuccessKey" as a variable within.

OnFailure and onFailureKey can behave in a similar fashion to the onSuccess counterparts, except these are activated on command failure to execute correctly.

Method 200 includes translating the application command into an equivalent set of one or more context code commands 122, the one or more context code commands 122 compatible with an operating system of the electronic device (202). For example, communication include package 103 can translate application command 109 into context code commands 122, including context code commands 122A and 122B. Context code commands 122 are compatible with an operating system used within computer architecture 100. For example, context code commands 122 can be Intents compatible with the Android operating system. Likewise, context code commands 122 can be URL parameters compatible with a URL scheme used by iOS.

Preload and Queuing

Method 200 includes queuing the equivalent one or more context code commands 122 for use by a router service, the router service configured to route context code commands 122 to corresponding communication processing services (203). For example, preload activity 106 can receive context code commands 122 and relay them to queue service 107. Queue service 107 can have a persistent process running in the background. When a context code command (e.g., an Intent or URL parameters) is presented to the queue, it is stored for execution at a later time, for example, when router service 108 is available. When router service 108 is available, it accepts the next context code command in the queue to be executed and performs tasks to complete the command.

In some embodiments, communications application 102 accepts context code commands 122 at a specified electronic address (e.g., a URL). When a context code command is registered at the address, it launches preload activity 106. Preload activity 106 loads the context code command into a queue to await execution at a later time. Queues allow communication application 102 to accept seemingly asynchronous calls to it from multiple application sources, even with blocking calls. Since some functions of communications application 102 can block and may take multiple cycles to execute, context code commands 122 can be queued up to allow for prior context code commands 122 to execute. An example of this is the following:

```
public class Preload extends Activity {
@Override
protected void onCreate(Bundle savedInstanceState) {
super.onCreate(savedInstanceState);
//get the parameters used in the creation of Activity
Intent intent = getIntent( );
Bundle bun = intent.getExtras( );
String JSONstr = null;
JSONstr = (String) bun.get("content");
//send the parameters over to the Queue
Intent intentsend = new Intent(Preload.this,
Queue.class);
intentsend.putExtra("params", JSONstr);
startService(intentsend);
finish( );
}
}
```

This Preload activity retrieves an Intent and its Extras in the "content" field and pre-packages it before sending it over to a Queue service. Afterwards, the Activity is closed.

Queue Service

In some embodiments, queue service 107 is persistent process that starts and runs independently of third party applications and preload activities. It holds a queue of context code commands 122 (e.g., Intents or URL parameters) that have come in from a third party application and have passed through the preload activity to enter the queue. Once notification is received that router service 108 is ready for command execution, the context code command next in line is sent to router service 108 for execution. An example of this is the following:

```
public class Queue extends Service {
ArrayList<Intent> queue;
String function;
ExecutionThread exeThread;
Bundle b;
Intent oldIntent;
public Queue( ) {
super( );
initVarsAndQueue( );
}
//startup the queue
private void initVarsAndQueue( ) {
queue = new ArrayList<Intent>( );
function = new String( );
oldIntent = new Intent( );
exeThread = new ExecutionThread( );
exeThread.start( );
}
//queue execution thread
public class ExecutionThread extends Thread {
@Override
public void run( ) {
super.run( );
while(true) {
if (queue.size( )!=0) {
//An intent from the queue and transfer the
    //parameters over to a sending intent
Intent topObj = queue.remove(0);
Intent intentsend = new Intent(Queue.this,Router.class);
Bundle bun = intentsend.getExtras( );
String JSONstr = null;
JSONstr = (String) bun.get("params");
intentsend.putExtra("params", JSONstr);
startService(intentsend,0);
}
}
}
}
//receipt of a new intent
@Override
protected void onStart( ) {
super.onStart( );
b = getIntent( ).getExtras( );
function = b.getString("function");
addToStack(function);
}
//add an intent to the stack
private void addToStack(String fun) {
Intent addIntent = new Intent(Queue.this, Add.class);
addIntent.putExtras(b);
queue.add(addIntent);
}
}
```

This queue example contains a list of Intents that are stored upon arrival through the on Start method. The queue service is persistent and continues to receive Intents in the background. The Queue also checks a router for availability and sends Intents from the list one by one to it accordingly.

Method 200 includes dequeuing a context code command to the router service, the context code command selected from among the equivalent one or more context code commands (204). For example, queue service 107 can dequeue context code command 122A (e.g., an intent of URL parameters). Queue service 107 can pass context code command 122A to router service 108.

Routing Service

In at least one embodiment, router service 108 routes the dequeued context code command to the appropriate corresponding communication processing service for processing (205). For example, router service 108 can route context code command 122A to an appropriate function. The appropriate function can be selected from among macro functions 109, QR functions 112, blue tooth functions 113, and any other functions that are available. As depicted, macro functions 109 can also send context code commands 122 to router service 108 for routing to other available functions.

Accordingly, router service 108 activates commands that control various functions and hardware on an installed device. Bluetooth functions include enabling Bluetooth, starting a Bluetooth connection as a Host, starting a Bluetooth connection as a client, setting up a connection message receiver, sending a message and retrieving Bluetooth settings information. QR functions include capturing a QR code via camera, encoding a QR code and displaying a QR code. Macro functions are a combination or chain of other functions within the router service—this allows for complex connection procedures to be executed with a single command. An example of a router service is the following:

```
public class Router extends Service{
private BluetoothAction bactivity;
private CaptureAction cactivity;
private MediaAction mactivity;
private FileAction factivity;
private MacroAction maccontrol;
private static Service currentAct;
private static final int ROUTER = 100;
public class RouterBinder extends Binder {
Router getService( ) {
return Router.this;
}
}
// This is the object that receives interactions from clients. See
// RemoteService for a more complete example.
private final IBinder mBinder = new RouterBinder( );
@Override
public IBinder onBind(Intent intent) {
return mBinder;
}
@Override
public void onCreate( ) {
super.onCreate( );
currentAct = this;
bactivity = new BluetoothAction( );
cactivity = new CaptureAction( );
mactivity = new MediaAction( );
factivity = new FileAction( );
maccontrol = new MacroAction( );
}
@Override
public int onStartCommand(Intent intent, int flags, int startId) {
String JSONstr = intent.getStringExtra("params");
routerExec(JSONstr);
// We want this service to continue running until it is explicitly
// stopped, so return sticky.
return START_STICKY;
}
//=================================================
// Execution List
//=================================================
public void routerExec(String JSONstr){
//parse the parameters into JSON
JSONObject params = new JSONObject( );
try{
JSONParser parser = new JSONParser( );
params = (JSONObject) parser.parse(JSONstr);
```

-continued

```
}catch(Exception e){ };
String code = null;
//command code
if(params.get("command") != null){
code = (String) params.get("command");
}
switch(SnapBluetoothSwitch.toEnum(code)){
// Macro Commands
case Macro_BluetoothQREncode:
maccontrol.macroQREncode(currentAct, params);
break;
case Macro_BluetoothQRDecode:
maccontrol.macroQRDecode(currentAct, params);
break;
case Macro_BluetoothHost:
maccontrol.macroBluetoothHost(currentAct, params);
break;
case Macro_MessageSubscribe:
        maccontrol.macroMessageSubscribe(currentAct,
        params);
break;
case Macro_MessagePublish:
maccontrol.macroMessagePublish(currentAct, params);
break;
// Bluetooth Commands
case Bluetooth_Enable:
bactivity.bluetoothEnable(currentAct, params);
break;
case Bluetooth_GetAddress:
bactivity.bluetoothAddress(currentAct, params);
break;
case Bluetooth_ConnectHost:
bactivity.connectHost(currentAct, params);
break;
case Bluetooth_ConnectClient:
bactivity.connectClient(currentAct, params);
break;
case Bluetooth_ConnectionReceive:
bactivity.connectionReceive(currentAct, params);
break;
case Bluetooth_ConnectionSend:
bactivity.connectionSend(currentAct, params);
break;
case Bluetooth_SocketInfo:
bactivity.blueoothSocketInfo(currentAct, params);
break;
// QR Capture Commands
case Capture_QRCapture:
cactivity.QRCapture(currentAct, params);
break;
case Capture_QREncode:
cactivity.QREncode(currentAct, params);
break;
}
}
}
```

This Router example distributes the specific Bluetooth, QR and Macro commands into separate class files for execution. These individual command implementations can vary and change based on an operating system API. Upon receiving a context code command, a receiving function can execute the context code command.

Callback Functionality

Method 200 includes determining a processing status of processing the context code command (206). Method 200 includes an act of indicating the processing status back to the application (207). For example, when execution of a function is complete, the receiving function formulates a process status (e.g., success, failure, etc.). Callback 114 can determine the processing status of functions that process context code commands 122. Callback 114 can send a response back to the calling component indicating the processing status. For example, callback 114 can send communications related response 123 to response handler 104. Alternatively, callback 114 can send a communications related response to response handler 111.

Example Functions

Various different types of functions can be included in macro functions 109, QR functions 112, and Bluetooth functions 113. Various examples of functions are now described.

Bluetooth Connection Establishment

The following example represents how Bluetooth functions 113 can be structured to execute a command for enabling Bluetooth on an Android device. To enable the Bluetooth Adapter on the Android operating system, communication application 102 makes a call to BluetoothAdapter.ACTION_REQUEST_ENABLE—like the following: Intent enableBtIntent=new Iten(BluetoothAdapter.ACTION_REQUEST_ENABLE); startActivityForResult(enableBtIntent, BLUETOOTH_ENABLE_INT);

Once this activity is complete, a result is returned and communication application 102 repackages the result and redirects it to the onSuccess address. An example of this is the following:

```
public class BluetoothEnable extends Activity{
private static String onSuccess = null;
private static String onFailure = null;
private static String onSuccessKey = null;
private static String onFailureKey = null;
public static final int BLUETOOTH_ENABLE_INT = 43902;
public BluetoothAdapter mBluetoothAdapter =
BluetoothAdapter.getDefaultAdapter( );
@Override
protected void onCreate(Bundle savedInstanceState) {
super.onCreate(savedInstanceState);
Intent intent = getIntent( );
Bundle bun = intent.getExtras( );
String JSONstr = (String) bun.get("params");
//parse the parameters into JSON
JSONObject params = new JSONObject( );
try{
JSONParser parser = new JSONParser( );
params = (JSONObject) parser.parse(JSONstr);
}catch(Exception e){ };
//router exec
enable(params);
}
protected void enable(JSONObject params){
//success parameter
if(params.get("onSuccess") != null){
onSuccess = (String) params.get("onSuccess");
}
//failure parameter
if(params.get("onFailure") != null){
onFailure = (String) params.get("onFailure");
}
//success parameter
if(params.get("onSuccessKey") != null){
onSuccessKey = (String) params.get("onSuccessKey");
}
//failure parameter
if(params.get("onFailureKey") != null){
onFailureKey = (String) params.get("onFailureKey");
}
//check if bluetooth is supported by this system
if (mBluetoothAdapter == null) {
// Device does not support Bluetooth
onFailure( );
}
//check if Bluetooth is already enabled
if (!mBluetoothAdapter.isEnabled( )) {
Intent enableBtIntent =
new Intent(BluetoothAdapter.ACTION_REQUEST_ENABLE);
startActivityForResult(enableBtIntent,
BLUETOOTH_ENABLE_INT);
}else
//Bluetooth Online Already
```

-continued

```
onSuccess( );
}
}
//Activity Return to the Snap Blue Worker
protected void onActivityResult(int requestCode, int resultCode, Intent data){
if(requestCode == BLUETOOTH_ENABLE_INT){
if(resultCode == RESULT_OK){
onSuccess( );
}else if(resultCode == RESULT_CANCELED){
onFailure( );
}else{onFailure( );}
}else{onFailure( );}
}
public void onSuccess( ){
if(onSuccess != null){
Intent intent = new Intent(onSuccess);
JSONObject JSONret = new JSONObject( );
if(onSuccessKey != null){
JSONret.put("key", onSuccessKey);
}
JSONret.put("result", "success");
intent.putExtra("content", JSONret.toJSONString( ));
startActivity(intent);
}
finish( );
}
public void onFailure( ){
if(onFailure != null){
Intent intent = new Intent(onFailure);
JSONObject JSONret = new JSONObject( );
if(onFailureKey != null){
JSONret.put("key", onFailureKey);
}
JSONret.put("result", "failure");
intent.putExtra("content", JSONret.toJSONString( ));
startActivity(intent);
}
finish( );
}
}
```

In this Bluetooth command executer, the Activity stores the parameters of onSuccess and onFailure. Then, the activity proceeds to call ACTION_REQUEST_ENABLE which performs the necessary operations to enable Bluetooth within the Android API. Once the operation is complete, Android sends a response to the request back to the Activity. The command Activity can then check to see if the execution was a success or failure and revive those parameters and keys accordingly. It then sends a response via Intent to the address "onSuccess" or "onFailure".

Macro Functions

Macro functions are particularly useful because they can bundle repetitive system processes and sequences into a single command. For example, capturing a QR code, decoding the data and, connecting to a Bluetooth port as a Client can be bundled into a single command "QR connect".

QR Encode

The following example represents how QR functions 112 can be structured to execute a command for encoding a QR code. For example, given an instanceId with a Bluetooth Host awaiting connection, this command retrieves the Bluetooth socket information, encodes it into a QR code and displays the newly formed code on screen. The following is an example of how a third party application can call this command (e.g., as application command 119):

```
JSONObject JSONstring = new JSONObject( );
JSONstring.put("command", "Macro_BluetoothQREncode");
JSONstring.put("instanceId", 1234);
```

```
Intent intent = new Intent("com.example.router");
intent.putExtra("content", JSONstring.toString( ));
startActivity(intent);
```

This example uses structure of the JSON Intent commands mentioned above. The command could be "QR_ENCODE" with parameters: instanceId, onSuccess (optional), onFailure (optional). An example of the command code from communication application 102 is as follows:

```
public class MacroQREncode{
private Service currentService;
private static MacroQREncode macrothis;
private String onSuccess = null;
private String onSuccessKey = null;
private String onFailure = null;
private String onFailureKey = null;
private Long outerInstanceId = null;
public MacroQREncode(Service currentSer, JSONObject params){
//NEEDS: instance ID of the connecting port
//DATA GATHERING
Long instanceId = null;
//save the success parameter
if(params.get("onSuccess") != null){
onSuccess = (String) params.get("onSuccess");
}
//success key parameter
if(params.get("onSuccessKey") != null){
onSuccessKey = (String) params.get("onSuccessKey");
}
//save the failure parameter
if(params.get("onFailure") != null){
onFailure = (String) params.get("onFailure");
}
if(params.get("onFailureKey") != null){
onFailureKey = (String) params.get("onFailureKey");
}
if(params.get("instanceId") != null){
if(params.get("instanceId").getClass( ).equals(Integer.class)){
Integer tempint = (Integer) params.get("instanceId");
instanceId = new Long(tempint.longValue( ));
}
else if(params.get("instanceId").getClass( ).equals(Long.class)){
instanceId = (Long) params.get("instanceId");
}
else if(params.get("instanceId").getClass( ).equals(String.class)){
String tempstr = (String) params.get("instanceId");
instanceId = new Long(tempstr);
}
else{onFailure( );return;}
}else{onFailure( );return;}
//DATA LOADING
currentService = currentSer;
macrothis = this;
outerInstanceId = instanceId;
//start here
step1( );
}
public static void response(Intent data){
//get the parameters used in the creation of this Activity
Bundle bun = data.getExtras( );
String content = (String) bun.get("content");
JSONParser parser = new JSONParser( );     //json.simple
JSONObject jsonin = null;
try {
jsonin = (JSONObject) parser.parse(content);
} catch (ParseException e) {e.printStackTrace( );}
String keya = (String) jsonin.get("key");
if(keya.equals("1")){
macrothis.step2(jsonin);
}
if(keya.equals("2")){
macrothis.step3(jsonin);
}
}
//start by inquiring of the bluetooth port data
public void step1( ){
Intent intent = new Intent("com.router");
JSONObject JSONstring = new JSONObject( );
JSONstring.put("instanceId", outerInstanceId);
JSONstring.put("command","Bluetooth_SocketInfo");
JSONstring.put("onSuccess", "com.macro.qrencode.handler");
JSONstring.put("onSuccessKey", "1");
intent.putExtra("content", JSONstring.toString( ));
intent.setFlags(Intent.FLAG_ACTIVITY_NEW_TASK);
currentService.startActivity(intent);
}
//generate a QR code
public void step2(JSONObject params){
String uuid = null;
String address = null;
//save the success parameter
if(params.get("deviceAddress") != null){
address = (String) params.get("deviceAddress");
}
//success key parameter
if(params.get("serviceUUID") != null){
uuid = (String) params.get("serviceUUID");
}
CaptureContextCode ccode = new CaptureContextCode( );
ccode.setBluetoothUuid(uuid);
ccode.setBluetoothAddress(address);
JSONObject jsonout = new JSONObject( );
jsonout.put("data", ccode.encode( ));
jsonout.put("onSuccess", "com.macro.qrencode.handler");
jsonout.put("onSuccessKey", "2");
Intent intent = new Intent(currentService, CaptureQREncode.class);
intent.putExtra("params", jsonout.toJSONString( ));
intent.setFlags(Intent.FLAG_ACTIVITY_NEW_TASK);
currentService.startActivity(intent);
}
//generate a QR code
public void step3(JSONObject params){
JSONObject jsonret = new JSONObject( );
if(onSuccess != null){
Intent intent = new Intent(onSuccess);
if(onSuccessKey != null){
jsonret.put("key", onSuccessKey);
}
jsonret.put("result", "success");
intent.putExtra("content", jsonret.toJSONString( ));
intent.setFlags(Intent.FLAG_ACTIVITY_NEW_TASK);
currentService.startActivity(intent);
}
}
//generate a QR code
public void onFailure( ){
JSONObject jsonret = new JSONObject( );
if(onFailure != null){
Intent intent = new Intent(onFailure);
if(onFailureKey != null){
jsonret.put("key", onFailureKey);
}
jsonret.put("result", "failure");
intent.putExtra("content", jsonret.toJSONString( ));
intent.setFlags(Intent.FLAG_ACTIVITY_NEW_TASK);
currentService.startActivity(intent);
}
}
}
```

Accordingly, in at least one embodiment, QR Encode is a multistep command. In this snippet of code, the constructor first begins by storing the onSuccess and onFailure parameters as well as the instanceId.

A first step of the sequence is to use "Bluetooth_SocketInfo" using instanceId as a parameter. The system returns the result to onSuccess, which it designated as the QR encode handler Activity address. The QR encode handler Activity passes the results to the response method within the QR encode class before finishing itself. Once the response from the first step is received in the QR encode class, the response method uses the onSuccessKey to go to a second step.

The second step sends a request to the Capture QR Encode class which is used to display a picture of a QR code for scanning, using the Bluetooth parameters acquired in the first step. The system returns the result to onSuccess, which it designated as the QR encode handler Activity address. The QR encode handler Activity passes the results to the response method within the QR encode class before finishing itself. Once the response from the second step is received in the QR encode class, the response method uses the onSuccessKey to go to a third step.

The third step returns a response to the command caller's onSuccess address. This ends the sequence of this command and lets the external/third-party application know that the command has completed successfully.

QR Connect

The following example represents how QR functions 112 can be structured to execute a command for connecting electronic devices using a QR code. This command initiates a QR capture process with a device's camera, decodes the resulting QR code, and uses the resulting parameters to complete a Bluetooth connection as a Client device. The following is an example of how a third party application can call this command (e.g., as application command 119):

```
JSONObject JSONstring = new JSONObject( );
JSONstring.put("command", "Macro_BluetoothQRDecode");
JSONstring.put("data", captureResponse);
JSONstring.put("instanceId", 1234);
JSONstring.put("onSuccess", "com.musicplayer.handler");
JSONstring.put("onSuccessKey", "9");
Intent intent = new Intent("com.example.router");
intent.putExtra("content", JSONstring.toString( ));
startActivity(intent);
```

This is using structure of the JSON Intent commands mentioned above. The command would be "QR_DECODE" with parameters: instanceId, onSuccess (optional), onFailure (optional). An example of the command code from communication application 102 is as follows:

```
public class MacroQRDecode {
private Service currentService;
private static MacroQRDecode macrothis;
private String onSuccess = null;
private String onSuccessKey = null;
private String onFailure = null;
private String onFailureKey = null;
private Long outerInstanceId = null;
public MacroQRDecode(Service currentSer, JSONObject params){
//NEEDS: nothing
//RETURNS: instanceId
//DATA GATHERING
Long instanceId = null;
currentService = currentSer;
macrothis = this;
//save the success parameter
if(params.get("onSuccess") != null){
onSuccess = (String) params.get("onSuccess");
}
//success key parameter
if(params.get("onSuccessKey") != null){
onSuccessKey = (String) params.get("onSuccessKey");
}
//save the failure parameter
if(params.get("onFailure") != null){
onFailure = (String) params.get("onFailure");
}
if(params.get("onFailureKey") != null){
onFailureKey = (String) params.get("onFailureKey");
}
if(params.get("instanceId") != null){
```

-continued

```
if(params.get("instanceId").getClass( ).equals(Integer.class)){
Integer tempint = (Integer) params.get("instanceId");
instanceId = new Long(tempint.longValue( ));
}
else if(params.get("instanceId").getClass( ).equals(Long.class)){
instanceId = (Long) params.get("instanceId");
}
else if(params.get("instanceId").getClass( ).equals(String.class)){
String tempstr = (String) params.get("instanceId");
instanceId = new Long(tempstr);
}
else{Log.e("BTReceiveThread", "Incorrect type: instanceId");}
}else{Log.e("BTReceiveThread", "Missing param: instanceId");}
outerInstanceId = instanceId;
//start this process
step1( );
}
public static void response(Intent data){
//get the parameters used in the creation of this Activity
Bundle bun = data.getExtras( );
String content = (String) bun.get("content");
JSONParser parser = new JSONParser( );    //json.simple
JSONObject jsonin = null;
try {
jsonin = (JSONObject) parser.parse(content);
} catch (ParseException e) {e.printStackTrace( );}
String keya = (String) jsonin.get("key");
if(keya.equals("1")){
macrothis.step2( );
}
if(keya.equals("2")){
macrothis.step3(jsonin);
}
if(keya.equals("3")){
macrothis.step4(jsonin);
}
}
public void step1( ){
Intent intent = new Intent("com.example.router");
JSONObject JSONstring = new JSONObject( );
JSONstring.put("command", "Bluetooth_Enable");
JSONstring.put("onSuccess", "com.macro.qrdecode.handler");
JSONstring.put("onSuccessKey", "1");
intent.putExtra("content", JSONstring.toString( ));
intent.setFlags(Intent.FLAG_ACTIVITY_NEW_TASK);
currentService.startActivity(intent);
}
public void step2( ){
Intent intent = new Intent("com.example.router");
JSONObject JSONstring = new JSONObject( );
JSONstring.put("command", "Capture_QRCapture");
JSONstring.put("onSuccess", "com.macro.qrdecode.handler");
JSONstring.put("onSuccessKey", "2");
intent.putExtra("content", JSONstring.toString( ));
intent.setFlags(Intent.FLAG_ACTIVITY_NEW_TASK);
currentService.startActivity(intent);
}
public void step3(JSONObject params){
CaptureContextCode ccode = new CaptureContextCode( );
String uuid = null;
String address = null;
String rcode = null;
if(params.get("data") != null){
rcode = (String) params.get("data");
}
ccode.decode(rcode);
uuid = ccode.getBluetoothUuid( );
address = ccode.getBluetoothAddress( );
JSONObject JSONstring = new JSONObject( );
JSONstring.put("deviceAddress", address);
JSONstring.put("serviceUUID", uuid);
JSONstring.put("command", "Bluetooth_ConnectClient");
JSONstring.put("onSuccess", "com.macro.qrdecode.handler");
JSONstring.put("onSuccessKey", "3");
if(outerInstanceId != null){
JSONstring.put("instanceId", outerInstanceId);
}
Intent intent = new Intent("com.example.router");
intent.putExtra("content", JSONstring.toString( ));
```

```
            intent.setFlags(Intent.FLAG_ACTIVITY_NEW_TASK);
            currentService.startActivity(intent);
        }
        //generate a QR code
        public void step4(JSONObject params){
            JSONObject jsonret = new JSONObject( );
            if(onSuccess != null){
                Intent intent = new Intent(onSuccess);
                if(onSuccessKey != null){
                    jsonret.put("key", onSuccessKey);
                }
                jsonret.put("result", "success");
                intent.putExtra("content", jsonret.toJSONString( ));
                intent.setFlags(Intent.FLAG_ACTIVITY_NEW_TASK);
                currentService.startActivity(intent);
            }
        }
        //generate a QR code
        public void onFailure( ){
            JSONObject jsonret = new JSONObject( );
            if(onFailure != null){
                Intent intent = new Intent(onFailure);
                if(onFailureKey != null){
                    jsonret.put("key", onFailureKey);
                }
                jsonret.put("result", "failure");
                intent.putExtra("content", jsonret.toJSONString( ));
                intent.setFlags(Intent.FLAG_ACTIVITY_NEW_TASK);
                currentService.startActivity(intent);
            }
        }
    }
}
```

Accordingly, in at least one embodiment, QR Decode is a multistep command. In this snippet of code, the constructor first begins by storing the onSuccess and onFailure parameters as well as the instanceId.

A first step of the sequence is to enable Bluetooth. Once complete, the system returns a response to onSuccess, which it designated as the QR decode handler Activity address. The QR decode handler Activity passes the results to the response method within the QR decode class before finishing itself. Once the response from the first step is received in the QR decode class, the response method uses the onSuccessKey to go to a second step.

The second step sends a request to the Capture QR Capture class which uses the device's camera to take a picture of a QR code. Once complete, the system returns a response to onSuccess, which it designated as the QR decode handler Activity address. The QR decode handler Activity passes the results to the response method within the QR decode class before finishing itself. Once the response from the second step is received in the QR decode class, the response method uses the onSuccessKey to go to a third step.

The third step receives the results from the QR capture in the second step and decodes it. The decoded parameters are used to facilitate a Bluetooth connection as a Client. An Intent call is made to "Bluetooth_ConnectClient" to finalize the Bluetooth connection between Host and Client. Once complete, the system returns a response to onSuccess, which it designated as the QR decode handler Activity address. The QR decode handler Activity passes the results to the response method within the QR decode class before finishing itself. Once the response from the third step is received in the QR decode class, the response method uses the onSuccessKey to go to a fourth step.

The fourth step returns a response to the command caller's onSuccess address. This ends the sequence of this command and lets the external/third-party application know that the command has completed successfully.

Connecting Electronic Devices

Figure 3:
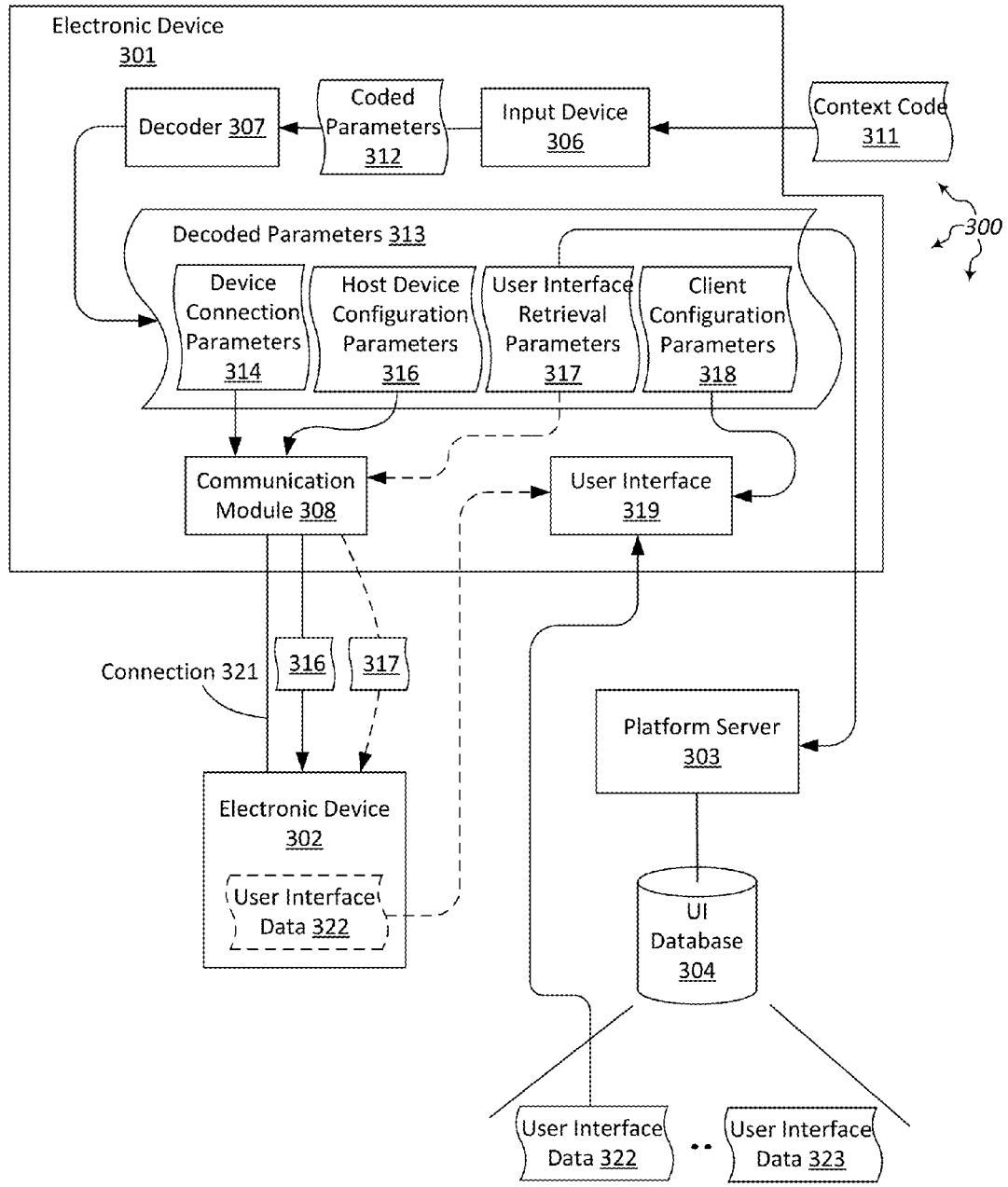
FIG. 3 depicts an example computer architecture for configuring a connection between electronic devices, according to one embodiment.

Accordingly, embodiments of the invention include decoding a context code, such as, for example, a QR code, to obtain parameters for connecting electronic devices. FIG. 3 depicts an example computer architecture 300 for configuring a connection between electronic devices. As depicted, computer architecture 300 includes electronic device 301 (e.g., a smartphone, tablet, laptop computer, desktop computer, etc.), electronic device 302 (e.g., a printer, computer, telephone, television, audio player, etc.), and platform server 303.

Electronic device 301 further includes input device 306 (e.g., a camera), decoder 307, and communication module 308. Decoder 307 can be included in communication module 308. However, for clarity decoder 307 is depicted separately from communication module 308. In general, decoder 307 is configured to decode encoded parameters into decoder parameters.

Platform server 303 is connected to UI database 304. UI database 304 can store user interface data for a variety of different applications.

Figure 4:
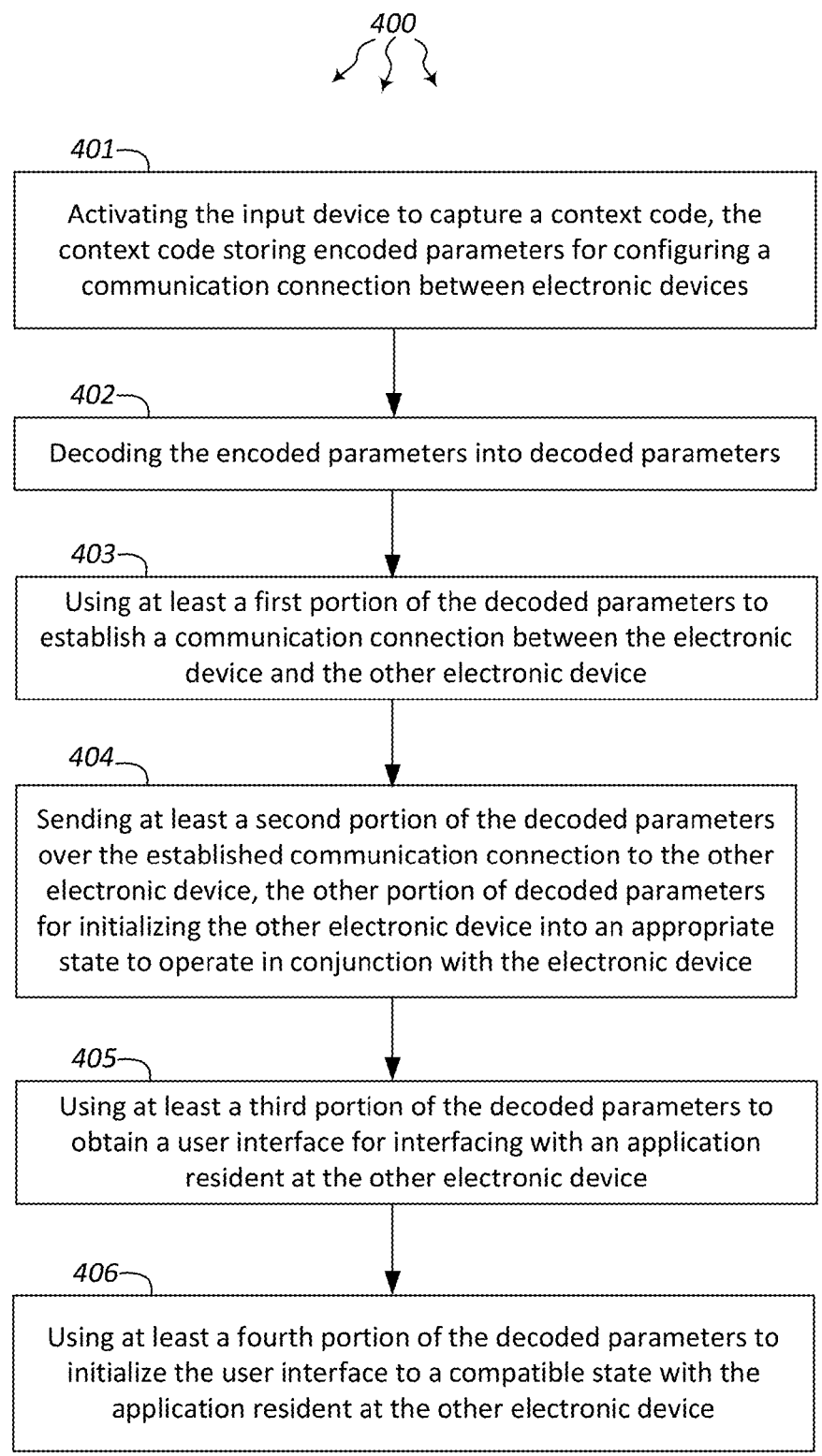
FIG. 4 depicts a flow chart of an example method for configuring a connection between electronic devices, according to one embodiment.

FIG. 4 depicts a flow chart of an example method 400 for configuring a connection between electronic devices. Method 400 will be described with respect to the components and data in computer architecture 300.

Method 400 includes activating the input device to capture a context code, the context code storing encoded parameters for configuring a communication connection between electronic devices (401). For example, input device 306 can be activated to capture context code 311. Context code 311 can store encoded parameters 312 for configuration a communication connection between electronic device 301 and electronic device 302

Method 400 includes decoding the encoded parameters into decoded parameters (402). For example, decoder 307 can decode encoded parameters 312 into decoded parameters 313. Decoded parameters 313 can be formatted in any suitable format, such as table, JSON, or XML format for easy access to the variables within. The code can also be encrypted and/or encoded to provide an additional security measure. As depicted, decoded parameters 313 can include device connection parameters 314, host device configuration parameters 316, user interface retrieval parameters 317, and client configuration parameters 318.

In general, device connection parameters 314 can include verification codes and/or identifiers used for security measures before pairing electronic devices with one another. In one embodiment, these codes may be embedded into the context code to aid in establishing the client to host connection. The communication mode security constraints can be satisfied by a client platform application in its context connection process.

In general, host device configuration parameters 316 can include parameters to send to a host device, so as to enable the host device (e.g., electronic device 302) to enter the appropriate state for operation in conjunction with the client device (e.g., electronic device 301). Both the client and host contexts may use these configuration parameters in order to establish operational connectivity between the devices. The host device may be notified of the intent or mode of the context so that it is adequately prepared to operate.

In general, client configuration parameters 318 drive the client device interface. Client configuration parameters 318 allow each application to develop an additional layer such that users can enter into specific modes within a single host application. For example, when configuring a television host application to establish a connection between the television and a mobile device, a standard mode may be to display the client mobile device interface in "remote mode" whereby the client device acts as a television remote. However, when a video is already playing on the client mobile device prior to initiating the connection to the television platform, the client device may be set to "video streaming mode" whereby the video immediately begins streaming to the television display.

Parameters of this type can also be used to determine spatial and/or relational data between the mobile device and the host device. Some context code mediums have the added benefit of distinct attributes that can yield calculated spatial or relational data, further enhancing a host application's capabilities. For example, a Quick Response (QR) code, besides storing bit data, also has a physical width and height. Such characteristics can be correlated to the actual QR code in photographs taken, such that the angle and distance of client devices in relation to the displayed QR code can be calculated.

In general, user interface retrieval parameters 317 can include identifying parameters used to retrieve a user interface base of a specific context instance for a client device. In one embodiment, an index is used, to allow a server (e.g., platform server 303) to search its database (e.g., UI database 304) and match the request with its user interface counterpart. To achieve this, each user interface and/or application submission can be tagged with an identifying parameter that is used to facilitate client device requests.

As an alternative to a server request for the user interface base, the client device (e.g., electronic device 301) can also request the user interface from the host device (e.g., electronic device 302). In this case, the host device transmits the interface over the established connection between itself and the client. Such a technique provides several advantages. For example: 1) it does not require access to the World Wide Web; 2) all communication is done locally and directly from device to device; and 3) there is no download bottleneck from the web transfers are generally much faster from a locally networked device than from an external server.

These client configuration parameters also allow a single host application to have multiple context codes. This feature allows an application to have a unified interface codebase while providing and/or restricting functionality or display elements for different use cases.

For example, a Wi-Fi router might come with two QR codes. One QR code allows a mobile device to pick up the SSID and/or password to allow a quick connection to Wi-Fi. The other QR code loads an administrative interface that provides more control options, such as allowing the user to adjust the passwords, manage IP addresses, and/or configure port forwarding and/or any other operational settings.

As another example, a cable television application may provide two QR codes. One QR code is for general use, for example allowing any user to surf channels. The other QR code allows the user to adjust parental settings, lock channels, etc.

Method 400 includes using at least a first portion of the decoded parameters to establish a communication connection between the electronic device and the other electronic device (403). For example, device connection parameters 314 can be sent to communication module 308. Communication module 308 can use device connection parameters 314 to establish connection 321 with electronic device 302.

In one embodiment, connection 321 is a Bluetooth pairing. Bluetooth allows for direct connection between two enabled devices, and provides a data transfer rate that is satisfactory for implementation of the present invention. In other embodiments, connection 321 is some other kind of connection, such as, for example, ZigBee, Wi-Fi, GSM, 3G, 4G, and the like.

In further embodiments, a combination of communication modes can be used. For example, Bluetooth or ZigBee can be used for most communications, but if a higher data transfer rate is needed for a specific application, the system can switch the communication mode to Wi-Fi and/or some other mechanism that provides the higher data transfer rate.

Method 400 includes sending at least a second portion of the decoded parameters over the established communication connection to the other electronic device, the other portion of decoded parameters for initializing the other electronic device into an appropriate state to operate in conjunction with the electronic device (404). For example, electronic device 301 can send host device configuration parameters 316 to electronic device 302 over connection 321. Device configuration parameters are for initializing electronic device 302 into an appropriate state for operating in conjunction with electronic device 301.

Method 400 includes using at least a third portion of the decoded parameters to obtain a user interface for interfacing with an application resident at the other electronic device (405). For example, electronic device 301 can use user interface retrieval parameters 317 to obtain user interface 319. User interface 319 can be used to interface with an application resident at electronic device 302. In some embodiments, electronic device 301 submits user interface retrieval parameters 317 to platform server 303. Platform server 303 uses user interface retrieval parameters 317 to identify user interface 322 from within UI database 304. Platform server 303 then returns user interface data 322 to electronic device 301. In other embodiments, electronic device 301 submits user interface retrieval parameters 317 to electronic device 302. In response, electronic device 302 returns user interface data 322 to electronic device 301.

Electronic device 301 uses user interface data 322 to load user interface 319 at electronic device 301. User interface 319 can include any of a number of different elements. For example, user interface 319 can use HTML, JavaScript, CSS and/or Flash, or any combination thereof. User interface 319 can also include XML, Java and/or Objective-C, which can be provided as native languages in a mobile device. The user interface can also include commands and/or instructions understood by a client platform application.

Method 400 includes using at least a fourth portion of the decoded parameters to initialize the user interface to a compatible state with the application resident at the other electronic device (406). For example, electronic device 301 can use client configuration parameters 318 to initialize user interface 319 to a compatible state with the application resident at electronic device 302.

Capturing QR Code with Mobile Device

Figure 5:
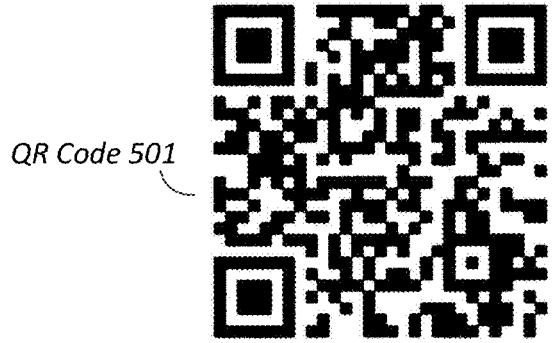
FIG. 5 depicts an example QR code for use in configuring a connection between electronic devices, according to one embodiment.
Figure 6A:
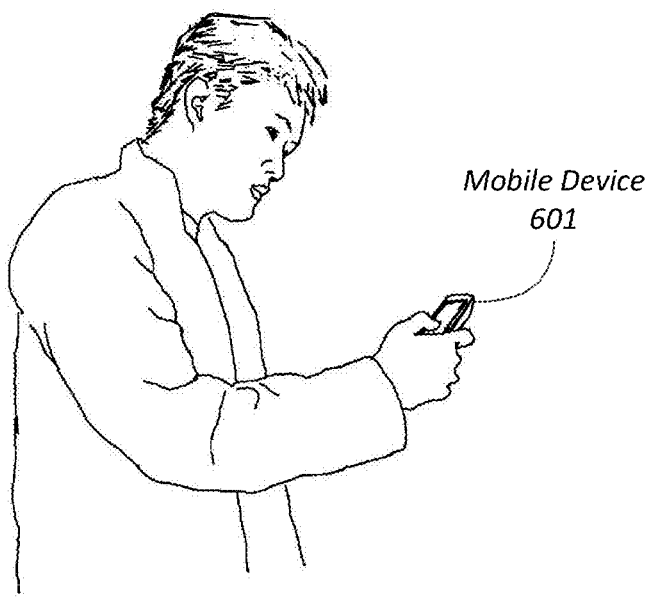
FIGS. 6A and 6B depict a user executing a QR code capture with a client electronic device, according to one embodiment.
Figure 6B:
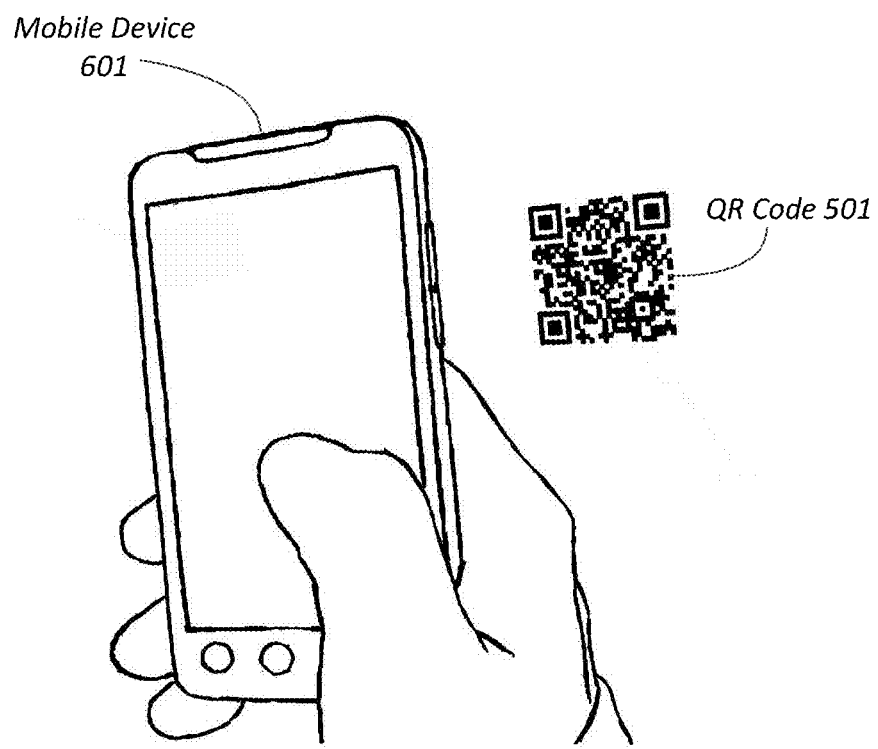

FIG. 5 depicts an example QR code 501 for use in configuring a connection between electronic devices. FIGS. 6A and 6B depict a user executing a barcode capture with a client electronic device. The user uses mobile device 601 to capture a picture of QR code 501.

Figure 7:
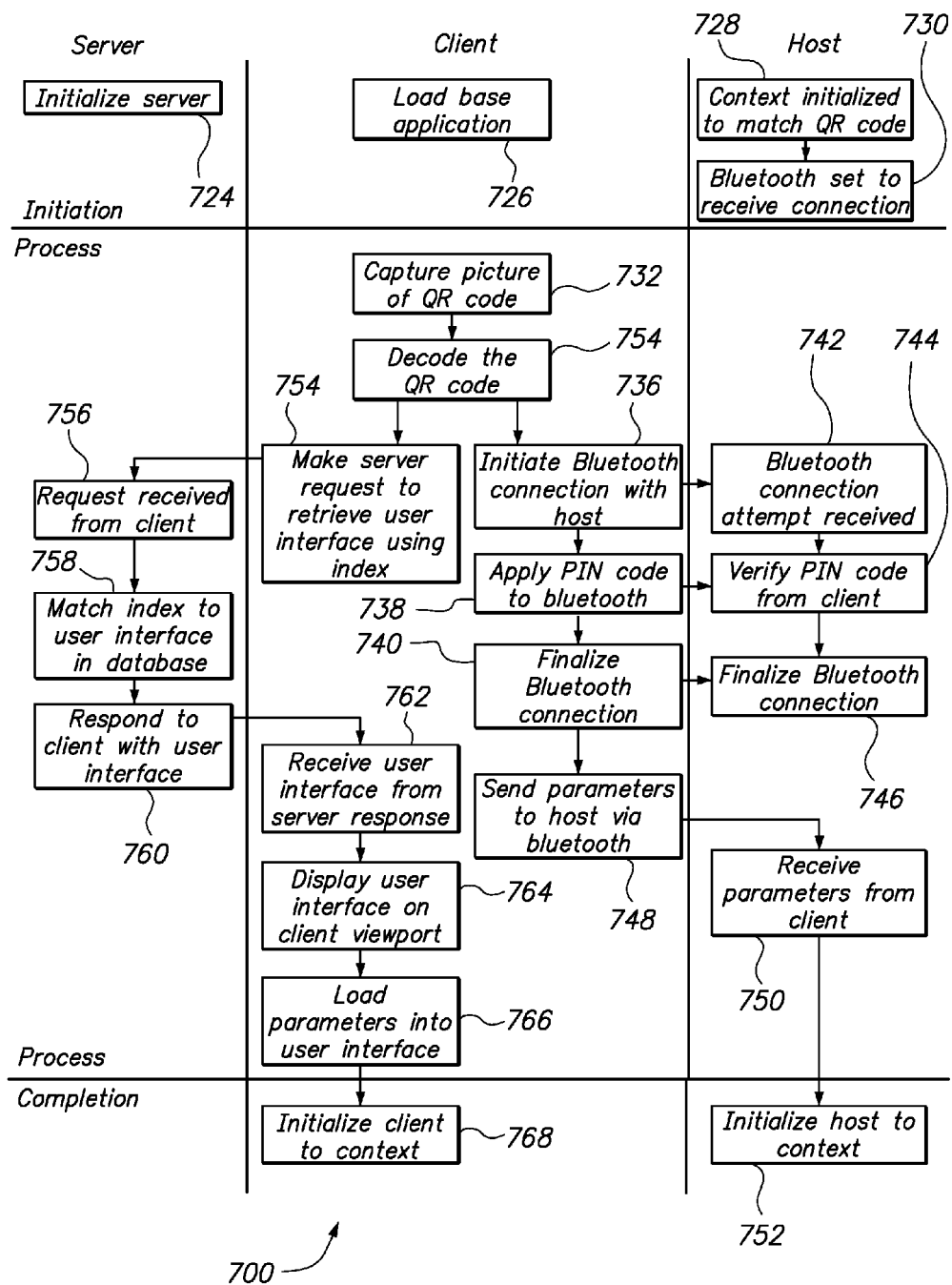
FIG. 7 depicts a flow chart of another example method for configuring a connection between electronic devices, according to one embodiment.

Referring now to FIG. 7, there is shown a method 700 for configuring a connection between electronic devices. Method 700 can be initiated at mobile device 601 in response to capturing the picture of QR code 501.

FIG. 7 depicts the interaction between a server, client device and host devices according to one embodiment. In the initialization stage, software is installed 728 at host device for driving the capture process and managing native interactions between the host device and the client device. The host device also has access to a Bluetooth connection and is configured to be ready 730 to connect with the client device. The server machine is initialized so that it is ready 724 to serve up user interfaces for the client device. The client device loads the base application 726 to facilitate the process.

To begin the connection process, the client device captures a picture 732 of QR code 501 (or any other machine-readable code). The client device then decodes 734 QR code 501 to obtain a number of variables, including for example: a code for Bluetooth connection 738, an index for the retrieving user interface material 758 from the server or from the host device, parameters to initialize the state of the client device 766, and/or parameters to initialize the state of the host device 750.

The client device establishes a connection to the host device via Bluetooth 736, using the connection code 738. In one embodiment, the devices achieve the connection, or pairing, by using the same code 744. The host device already has the connection code available in its ready state, and the client device retrieves it from the barcode scan.

After a Bluetooth connection is established between the host device and the client device 740, 746, initialization parameters (decoded from the barcode) are passed from the client to the host device 748 to initiate the state of the host device 752, such that its operation complements that of the client device 768.

In at least one embodiment, the client device sends a request to the server 754 to return user interface material to the client. This may take place, for example, concurrently with establishment of the Bluetooth connection. In one embodiment, the request specifies the index of the user interface, which is retrieved from the decoded barcode. The server matches the index to the appropriate user interface in its database 758 and returns the user interface to the client 760. This user interface request can also be made of the host device; in such a variation, after the Bluetooth connection is established, the host device sends user interface material to the client device.

User interface material can be in any suitable form. Example include: process or commands understood by the application of this technology, web language (HTML, JavaScript, CSS) and/or the client's native operating system commands.

After the user interface is loaded on the client device 764, initialization parameters (decoded from the barcode) are passed into the user interface 766 to initiate the state of the client device 768, such that its operation complements that of the host device 752.

Alternative Embodiment

As mentioned above, in an alternative embodiment, the client device can request the user interface 754 from the host device, if the host device permits. In this case, the request is made over the Bluetooth connection line after it has been finalized 740. In response to the request, host device provides the relevant user interface, and both devices continue with operation as described above, starting with steps 762 and 748.

In this alternative embodiment, only the host and client devices are present. Such an embodiment simplifies and localizes the process, potentially improving security and allowing for faster, more direct downloading.

Data Exchange Between Connected Devices

Figure 10:
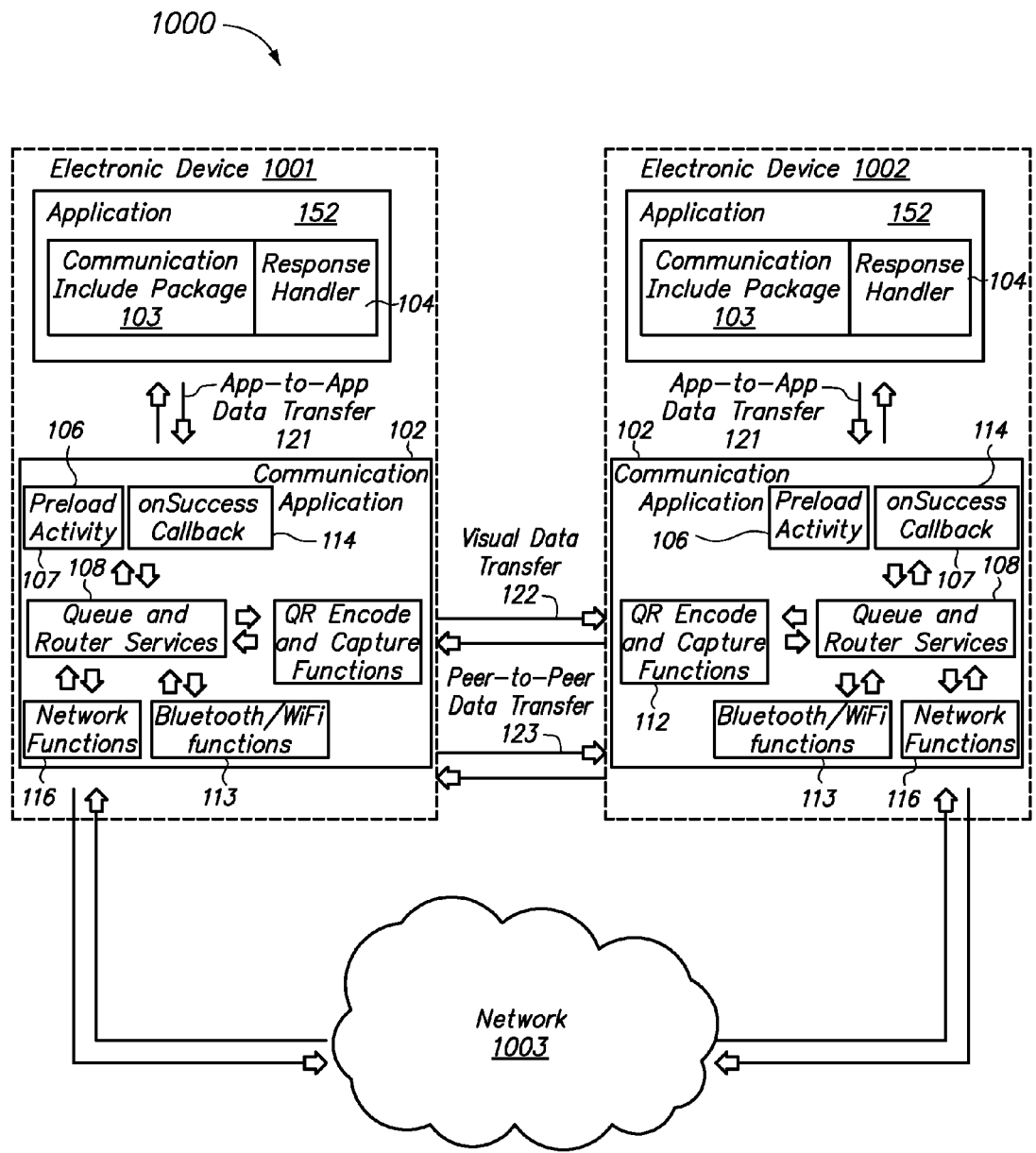
FIG. 10 depicts an example architecture for connected devices exchanging data, according to one embodiment.

FIG. 10 depicts an example of an architecture 1000 for connected devices exchanging data. As depicted, electronic devices 1001 and 1002 communicate with one another via network 1003. Each of electronic devices 1001 and 1002 is configured similarly to the computer architecture 100 depicted in FIG. 1. As such, each electronic device 1001, 1002 includes an application 152 and a communication application 102. Each application 152 includes communication include package 103 along with response handler 104. Each communication application 102 includes preload activity 106, queue and router services 107, 108, QR encode and capture functions 112, Bluetooth/WiFi functions 113, callback 114, and network functions 116.

Application to application data transfer 121 can be facilitated between application 152 and communication application 102 at each electronic device 1001, 1002. Using network functions 116, communication applications 102 exchange data via network 1003. As depicted, visual data transfer 122 (e.g., of UI data) and peer-to-peer data transfer 123 can occur.

Communication Application User Interface

Figure 11B:
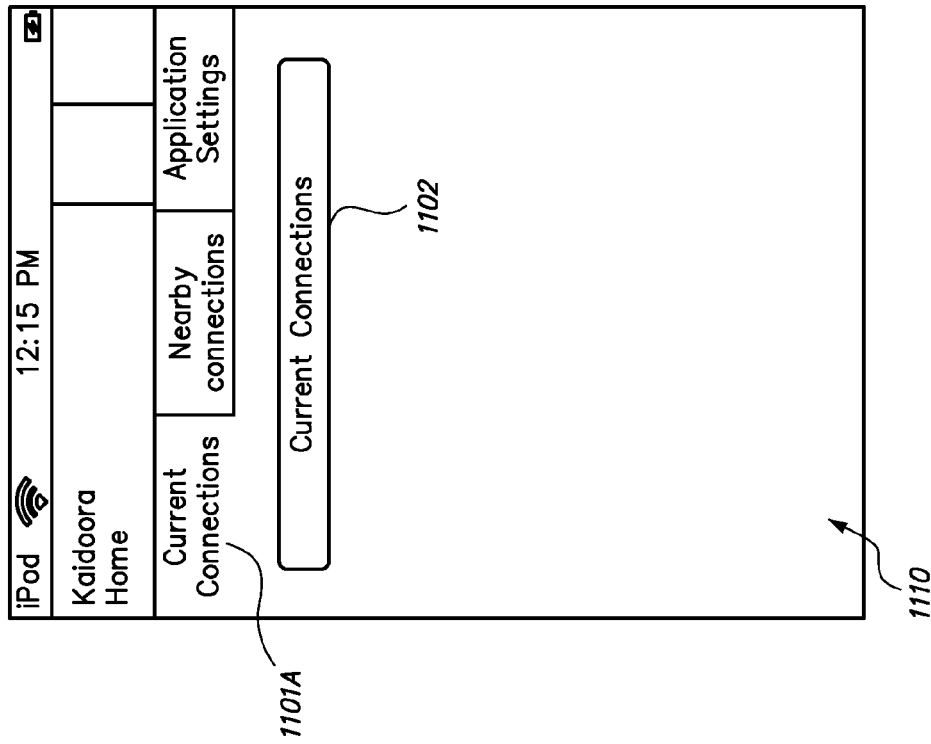
Figure 11A:
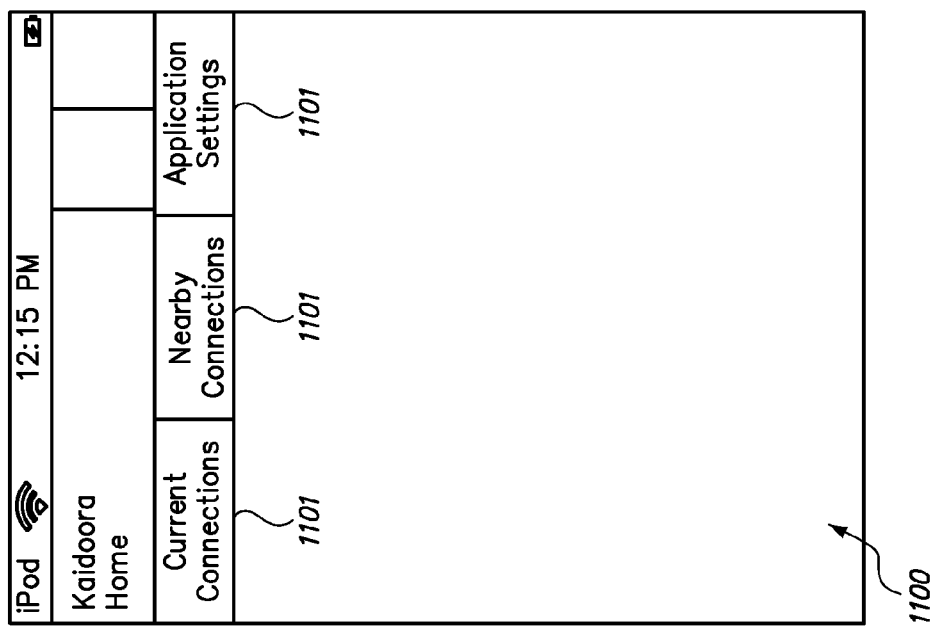

A communication application (e.g., any of communication applications 102, 804, 854, etc.) can include a user interface to assist a user with accessing functionality of the communication application. Referring now to FIGS. 11A-11C, there are shown various examples of user interface screens 1100, 1110, 1120 that can be presented by a communication application 102 according to at least one embodiment. As such, a communication application 102 can present information about current connections and accessible nearby connections, and can also permit a user to access and change application settings.

In at least one embodiment, as depicted in FIGS. 11A-11C, tabs 1101 provide access to different types of information. In screen 1110 as depicted in FIG. 11B, a current connections tab 1101A has been selected, causing a list 1110 of current connections to be displayed (in this example, the list is empty). In screen 1120 as depicted in FIG. 11C, a nearby connections tab 1101E has been selected, causing a list 1120 of accessible nearby connections to be displayed.

A communication application can also display options for activating various communication related functions. For example, referring now to FIG. 12, there is shown an example of a user interface screen 1200 displaying various communication options as previously described, according to at least one embodiment. Button 1201 provides information about a host connection; button 1202 displays a QR code; and button 1203 activates an interface for scanning a QR code.

A communication application can also display a QR (or other optically readable code) at a display device. For example, referring now to FIG. 13, there is shown an example of a screen 1300 for depicting a QR code 1301 on a mobile device according to at least one embodiment. Such a screen 1300 can be presented, for example, after a QR code 1301 has been scanned. The user is given an opportunity to cancel the scan and connect operation by tapping on Cancel button 1302.

Figure 14B:
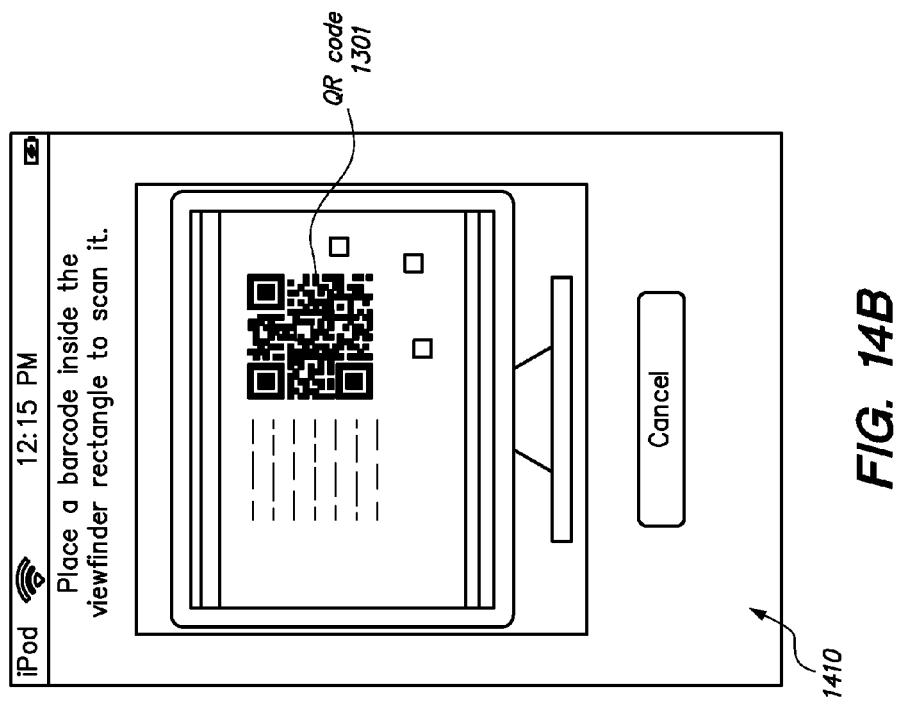

A communication application can also assist with capturing a QR (or other optically-readable) code. For example, referring now to FIGS. 14A and 14B, there are shown examples of screens 1400, 1410 for assisting with capturing a QR code according to at least one embodiment. Each such screen 1400, 1410 depicts the image currently seen through the camera of an electronic device, for example, device 601, so as to provide feedback to enable the user to properly align the electronic device with QR code 1301. Any suitable feedback can be provided for assisting with this operation, such as highlighted areas of the screen and/or other visual, auditory, and/or haptic feedback.

One skilled in the art will recognize that the screens depicted herein are merely exemplary, and that other layouts and arrangements can be used without departing from the essential characteristics of the invention.

User Sequence Experience

Figure 15:
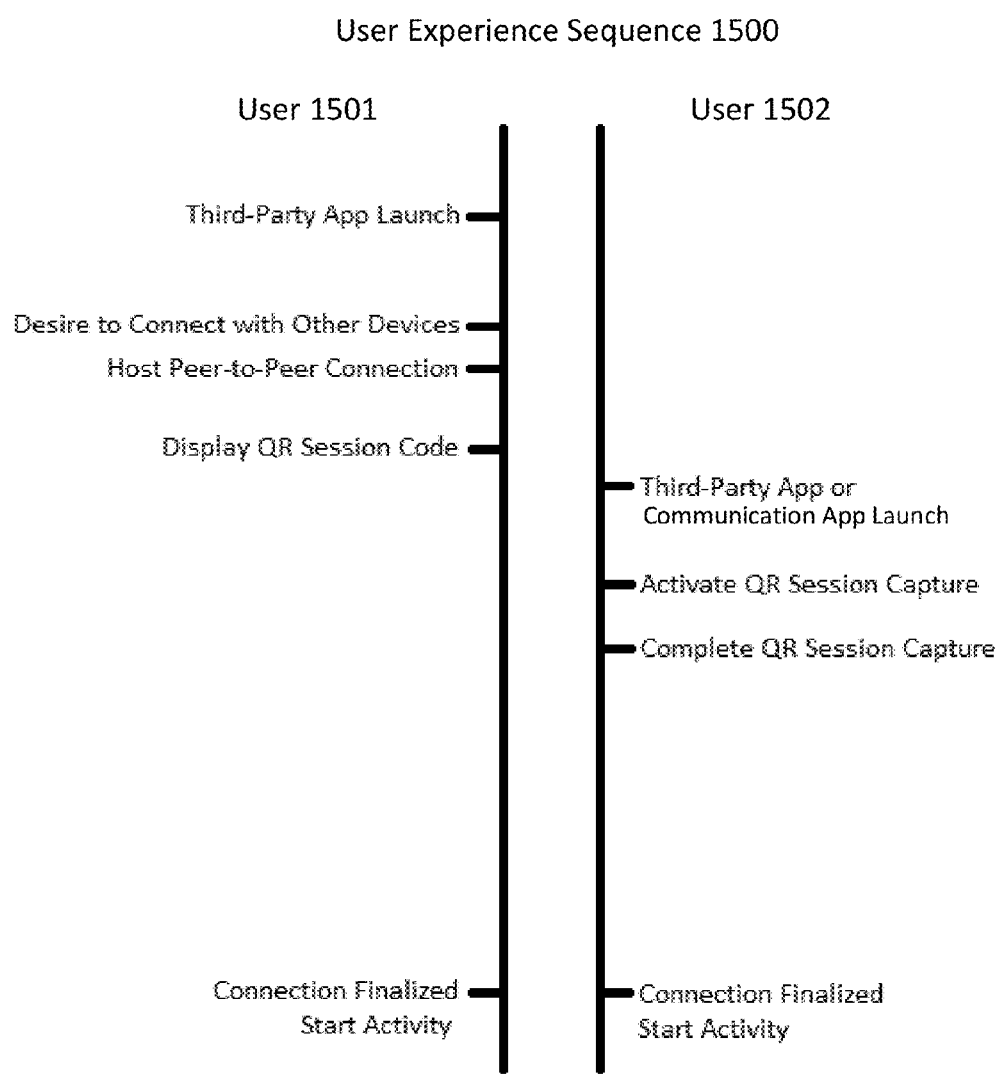
FIG. 15 depicts an example user experience sequence for users of electronic devices that are connecting to one another, according to one embodiment.

FIG. 15 depicts an example user experience sequence 1500 for users of electronic devices that are connecting to one another, according to at least one embodiment. Users can interact with user interface screens at respective electronic devices (including user interfaces screens as previously described) to connect the respective electronic devices to one another.

User 1501 can launch an application and indicate a desire to connect with other devices. In response, user 1501 can host a peer-to-peer connection and display a QR sessions code at a respective electronic device. User 1502 can launch a third party or communication application. User 1502 can activate and complete a QR session capture at a respective electronic device. A connection can be finalized at each respective electronic device and activity started between the respective electronic devices.

Extensive User Interface

As described, embodiments of the invention can utilize the Android operating system. For these embodiments, a user interface can include a Webview. When a connection is completed via a communication application, an additional step can be taken where one electronic (e.g., a host) device sends a functional HTML/Javascript package to another electronic (e.g., a client) device.

For example, within a communication application at a client device, a Webview can be initialized and loaded with a HTML and Javascript infrastructure. This infrastructure can be modified and built upon using AJAX loading techniques. AJAX commands can be passed to Javascript from Java by injecting Javascript events onto the Webview whilst triggering them simultaneously. Commands can be passed back to Java via class instantiations on the Java level that transcend the Webview to provide an outlet for the Javascript level.

Upon completing a connection, the Host device's communication application can retrieve a HTML/Javascript package from the third-party application of the same device. Once obtained, the Host device's communication application can send the package across the connection to the Client device. Once a HTML/Javascript package is received by the communication application on the Client device end, that code package is injected into the Webview via Javascript event and loaded in the Webview using an AJAX webpage load.

Once the interface is loaded, the user is able to receive notifications and actions regarding the connection from within the extensive UI as well as give commands to the respective communication application. For example, a user can press on a button or enter information that gets passed down from Javascript to the Java level and then relayed across the peer-to-peer communication line.

Similar mechanisms can be used for embodiments of the invention that utilize iOS. For iOS embodiments, the following Android mechanisms can be mapped to iOS mechanisms as follows:

Webview—UIWebview
Intent—Url scheme
Java—Objective-C (*.m and *.h files)
XML—Xib For iOS systems, activity and services can also be programmed to achieve results similar to Android systems Features of the Invention In various aspects, the present invention provides several features and advantages over prior art systems. Examples of such features and advantages are described below.

Memorization Feature

In one embodiment, the client platform application on the client device has the ability to memorize the context code of previously paired devices. In one embodiment of the present invention, the client device can recall the full context code of the connection. This allows the client device to proceed directly to the purpose for which the initial connection was established, including retrieval of the user interface.

Control Aspect

In one embodiment, the system of the present invention allows a client device to control and/or utilize a function of the host device. For example, the host device may offer some sort of service, functionality, input, or output device that may not be readily available on the client device itself: examples include additional screen space, an audio outlet, a video outlet, document printing, restaurant ordering system or the like. Accordingly, the system of the present invention allows a portable client device to instantly and easily gain access to features of the host device simply by capturing a photograph of a context code and performing the steps described herein.

Device Network Aspect

The techniques described herein, including the use of context code technology coupled with its memorization feature, create a structure for device networking. Client and host devices can search for other context devices within their locale with the added possibility of grouping or joint activation. This allows multiple devices to achieve a unified purpose or task. For example, a user is at home using his/her mobile device to browse through movies on his/her desktop computer, using the context technology. Upon selecting a movie to play, the client device locates a nearby large television screen, previously synchronized. The client device prompts the user as to whether he/she would like the movie feed to be played on that device. The user confirms, and the video feed is streamed to the television device. The client device also locates the home stereo system and lighting controls and prompts the user as to whether he/she would like to control those devices. The user confirms both. The result is a home theater experience provided by three separate systems synchronized with the technology of the present invention.

In one embodiment, singular context codes are provided, each of which synchronizes with many devices. For example, upon arrival at an office workspace, an employee can capture a single QR code with his/her mobile device to synchronize with an external monitor, a keyboard, a mouse, a printer and a Wi-Fi connection.

Social Aspect

In one embodiment, the system of the present invention allows multiple client devices to contribute to a single host device session. It allows users to interact with one another within the software/user interface space as well as the hardware space. Essentially, multiple users can manipulate and control one or more of the same devices.

For example, a poker application can be created such that multiple clients can join a single game using the invention. A host device can load a poker application and start a game instance. From the instance, a context code can be displayed so that other client devices can capture a photograph of the QR code and automatically join the available game. This can work for multiple client devices and can be used to form a social network between clients, so that a game of poker can be played.

Another example is universal music playlist. A car stereo adapter can be created such that capturing a photograph of the context code with a client device automatically causes a device to synchronize with the adapter. The user interface can include an open playlist, allowing users to add, skip, arrange or remove songs as desired. The social aspect of the invention allows multiple users to add their own songs to the queue and arrange the order of future songs in the queue each to their liking, while the car stereo continuously plays songs from that playlist.

Synchronizing Components

Figure 8A:
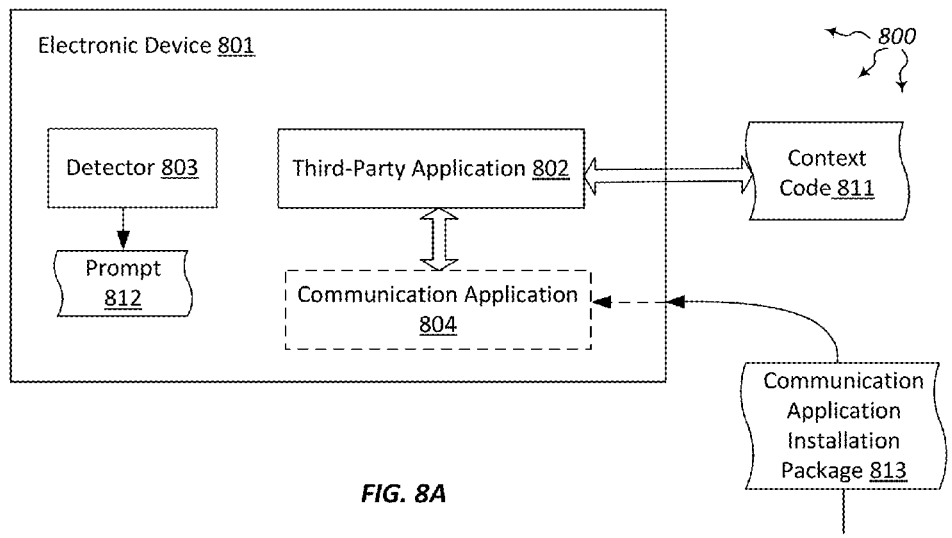
FIG. 8A depicts an example computer architecture for synchronizing an application between electronic devices, according to one embodiment.

FIG. 8A depicts an example computer architecture 800 for synchronizing an application between electronic devices. As depicted, computer architecture 800 includes electronic device 801. Electronic device 801 further includes third-party application 802 and detector 803. During operation of electronic device 801, third-party application 802 can attempt to obtain or create context code 811 (e.g., a QR code) for use in connecting with third-party applications at other electronic devices. As previously described, these operations can include interaction with a communication application for appropriate processing.

Detector 803 can detect that no communication application is installed at electronic device 801. In response, detector 803 can present prompt 812 (an audible or visual indication at an output device of electronic device 801) to a user of electronic device 801. Prompt 812 can alert the user to install a communication application. The user can then access communication application installation package 813 to install communication application 804.

Figure 8B:
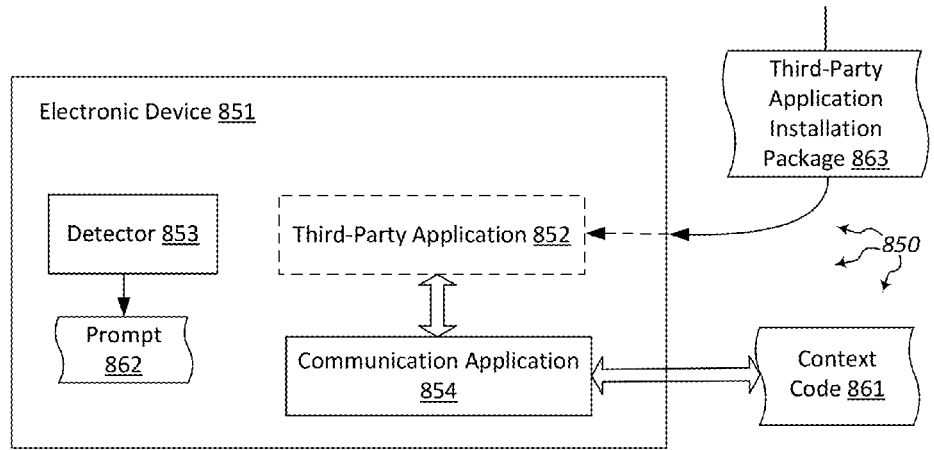
FIG. 8B depicts another example computer architecture for synchronizing an application between electronic devices, according to one embodiment.

FIG. 8B depicts another example computer architecture 850 for synchronizing an application between electronic devices. As depicted, computer architecture 850 includes electronic device 851. Electronic device 851 further includes communication application 854 and detector 853. During operation of electronic device 851, communication application 854 can obtain context code 861 (e.g., a QR code). Context code 861 can correspond to third-party applications at other electronic devices. As previously described, this operation can include interaction between communication application 854 and the appropriate third-party application at electronic device 851 for processing.

Detector 853 can detect that the appropriate third-party application is not installed at electronic device 851. In response, detector 853 can present prompt 862 (an audible or visual indication at an output device of electronic device 851) to a user of electronic device 851. Prompt 862 can alert the user to install the appropriate third-party application. The user can then access third party application installation package 863 to install third-party application 852.

Figure 9:
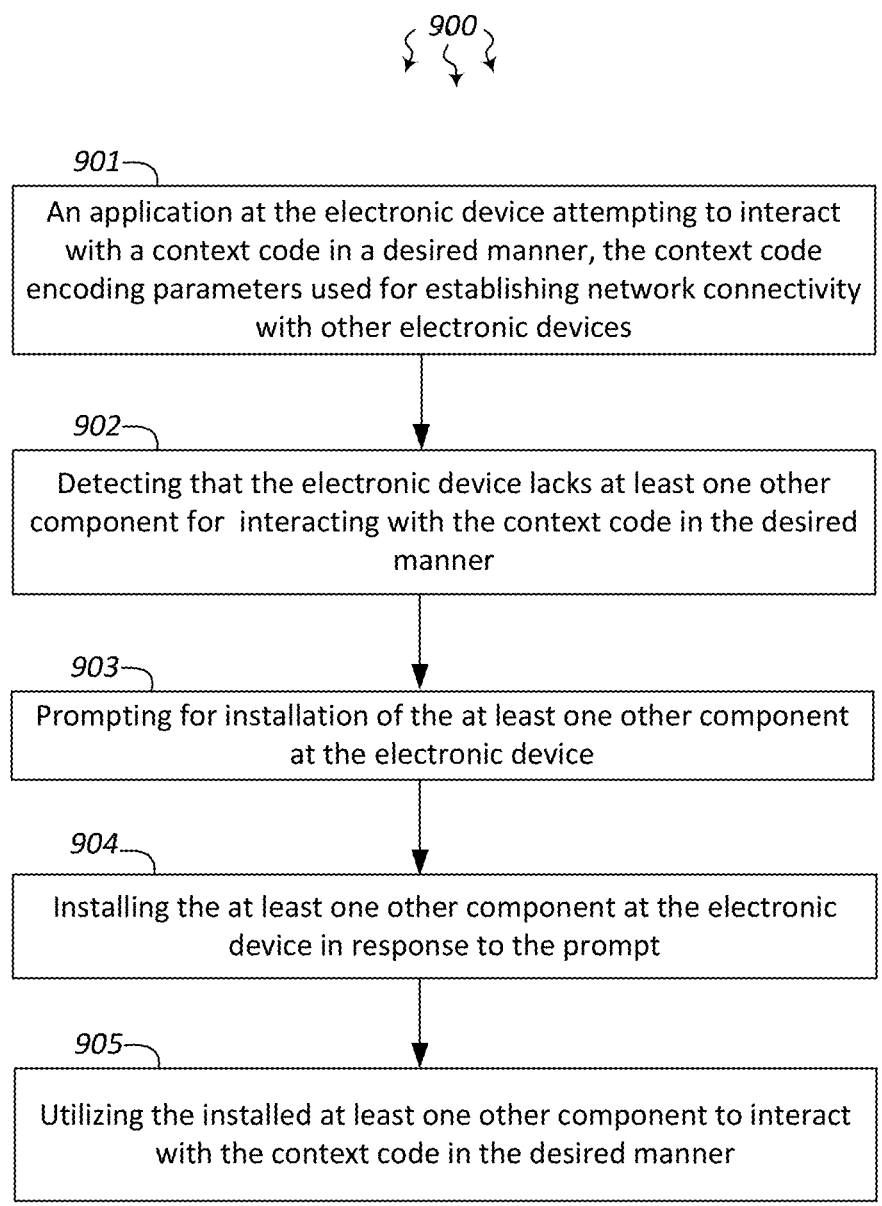
FIG. 9 depicts a flow chart of an example method for synchronizing an application between electronic devices, according to one embodiment.

FIG. 9 depicts a flow chart of an example method 900 for synchronizing an application between electronic devices. Method 900 will be described with respect to the components and data depicted in computer architectures 800 and 850.

According to at least one embodiment, an application at the electronic device attempts to interact with a context code in a desired manner, the context code encoding parameters used for establishing network connectivity with other electronic devices (901). For example, third-party application 802 can attempt to obtain or create context code 811.

Alternatively, communication application 854 can obtain context code 861.

Method 900 includes detecting that the electronic device lacks at least one other component for interacting with the context code in the desired manner (902). For example, detector 803 can detect that electronic device 801 lacks a communication application to process context code 811 and/or related parameters. Alternatively, detector 853 can detect that electronic device 851 lacks a third-party application corresponding to context code 861.

Method 900 includes prompting for installation of the at least one other component at the electronic device (903). For example, detector 803 can issue prompt 812 to prompt for installation of a communication application. Alternatively, detector 853 can issue prompt 862 to prompt for installation of the corresponding third-party application.

Method 900 includes installing the at least one other component at the electronic device in response to the prompt (904). For example, electronic device 801 can access communication application installation package 813 to install communication application 804. Alternatively, electronic device 851 can access third party application installation package 863 to install third-party application 852.

Method 900 includes utilizing the installed at least one other component to interact with the context code in the desired manner (905). For example, third-party application 802 can interact with communication application 804 to process context code 811 and/or related parameters. Alternatively, communication application 854 can interact with third-party application 852 to process context code 861.

Accordingly, embodiments of the invention can use a context code, such as, for example, a QR code to facilitate electronic device networking. The connection process between electronic devices is automated. For example, upon snapping a picture, a communication application establishes connection between devices and also serves as a port between the connected devices. Networking code can be greatly simplified, permitting application developers to devote more resources to developing application code.

Electronic Device Configurations

In various embodiments of the present invention, an electronic device, such as, for example, any of electronic devices 301, 302, 801, 851, 1001, and/or 1002, can be any electronic device configured to initiate and/or receive electronic communications; for example, smartphone, cell phone, desktop computer, laptop computer, personal digital assistant (PDA), music player, handheld computer, tablet computer, kiosk, game system, television, or the like. In at least one embodiment, an electronic device is an iPhone 4S, available from Apple Inc. of Cupertino, Calif., running an operating system such as iOS, also available from Apple Inc. of Cupertino, Calif.

In at least one embodiment, any of electronic devices 301, 302, 801, 851, 1001, and/or 1002 comprises a number of hardware components as are well known to those skilled in the art. For example, any of electronic devices 301, 302, 801, 851, 1001, and/or 1002 can include an input device 104 such as, for example, a keyboard, mouse, touchscreen, trackball, trackpad, five-way switch, voice input device, joystick, and/or any combination thereof. In embodiments wherein an input device is a touchscreen, a virtual keyboard and/or other input elements can be displayed thereon, according to known techniques. A display screen is also provided, for displaying a user interface wherein text messages can be composed and read, and wherein a user can read and/or interact with, for example, QR codes, according to the techniques described herein. Any of electronic devices 301, 302, 801, 851, 1001, and/or 1002 can also include other input and/or output device(s) (not shown), such as a microphone, speaker(s), camera(s), button(s), servomotor (for enabling vibrate alerts), and the like. Electronic devices can be controlled in various ways, including voice control, according to well-known means.

Any of electronic devices 301, 302, 801, 851, 1001, and/or 1002 can include one or more processors. A processor can be a conventional microprocessor for performing operations on data under the direction of software, according to well-known techniques. Any of electronic devices 301, 302, 801, 851, 1001, and/or 1002 can also include memory. Memory can be random-access memory having a structure and architecture as are known in the art, for use by a processor in the course of running software. Any of electronic devices 301, 302, 801, 851, 1001, and/or 1002 can also include a communications interface. A communications interface can include any software and/or hardware for enabling communications via a communications network. Such interfaces can include a radio, for example, for enabling transmission and reception of data across a cellular telephone network or other wireless network.

Any of electronic devices 301, 302, 801, 851, 1001, and/or 1002 can also include data storage. Data storage can be any magnetic, optical, and/or electrical storage device for storage of data in digital form; examples include flash memory, magnetic hard drive, CD-ROM, and/or the like.

One skilled in the art will recognize that the described arrangement of hardware elements is merely exemplary, and that invention can be implemented using different hardware elements configured in any of a number of different ways. Thus, any described architectures are merely illustrative and not intended to limit the scope of the invention in any way. In alternative embodiments, the system of the present invention can be implemented in other ways.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment or embodiments.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured when a processor executes a computer program at the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. At a first electronic device, the first electronic device including a processor and system memory, the first electronic device also including an input device, a method for configuring a connection between the first electronic device and a second electronic device, the method comprising:
    at the first electronic device, activating the input device to capture a context code, the context code storing encoded parameters for configuring a communication connection between electronic devices;
    decoding the encoded parameters into decoded parameters;
    at the first electronic device, using at least a first portion of the decoded parameters to establish a communication connection between the first electronic device and the second electronic device; and
    subsequent to establishing the communication connection, sending at least a second portion of the decoded parameters over the established communication connection to the second electronic device, the second portion of decoded parameters for initializing the second electronic device into an appropriate state to operate in conjunction with the first electronic device.

2. The method as recited in claim 1, further comprising:
    subsequent to establishing the communication connection, using at least a third portion of the decoded parameters to obtain a user interface for interfacing with an application resident at the second electronic device; and
    subsequent to establishing the communication connection, using at least a fourth portion of the decoded parameters to initialize the user interface to a compatible state with the application resident at the second electronic device.

3. The method as recited in claim 2, wherein using at least a third portion of the decoded parameters to obtain a user interface comprises:
    identifying decoded parameters that identify the application resident at the second electronic device;
    sending the identified decoded parameters to a platform server; and
    receiving the user interface from the platform server.

4. The method as recited in claim 2, wherein using at least a third portion of the decoded parameters to obtain a user interface comprises:
    requesting the user interface from the second electronic device; and
    receiving the user interface from the second electronic device.

5. The method of claim 2, wherein the third portion of the decoded parameters is configured to cause the first electronic device to request and receive the user interface from the second electronic device.

6. The method of claim 2, wherein the third portion of the decoded parameters is configured to cause the first electronic device to request the user interface from a server.

7. The method as recited in claim 1, wherein activating the input device to capture a context code comprises activating a camera to capture an optically-readable barcode.

8. The method as recited in claim 1, wherein activating the input device to capture a context code comprises capturing a context code using at least one of:
    Near Field Communication (NFC); and
    Radio-Frequency Identification (RFID).

9. The method of claim 1, wherein the second portion of the decoded parameters is configured to initialize the second electronic device into one of a plurality of available states for operation in conjunction with the first electronic device.

10. A computer program product for use at a first electronic device, the first electronic device also including an input device, the computer program product for implementing a method for configuring a connection between the first electronic device and a second electronic device, the computer program product comprising a nontransitory computer-readable storage medium having stored thereon computer-executable instructions that, when executed by a processor, cause the first electronic device to: activate the input device to capture a context code, the context code storing encoded parameters for configuring a communication connection between electronic devices; decode the encoded parameters into decoded parameters; use at least a first portion of the decoded parameters to establish a communication connection between the first electronic device and the second electronic device; and subsequent to establishing the communication connection, send at least a second portion of the decoded parameters over the established communication connection to the second electronic device, the second portion of decoded parameters for initializing the second electronic device into an appropriate state to operate in conjunction with the first electronic device.

11. The computer program product as recited in claim 10, further comprising computer-executable instructions that, when executed by a processor, cause the first electronic device to:
    subsequent to establishing the communication connection, use at least a third portion of the decoded parameters to obtain a user interface for interfacing with an application resident at the second electronic device; and
    subsequent to establishing the communication connection, use at least a fourth portion of the decoded parameters to initialize the user interface to a compatible state with the application resident at the second electronic device.

12. The computer program product as recited in claim 11, wherein the computer-executable instructions that, when executed by a processor, cause the first electronic device to use at least a third portion of the decoded parameters to obtain a user interface comprise computer-executable instructions that, when executed by a processor, cause the first electronic device to:
   identify decoded parameters that identify the application resident at the second electronic device;
   send the identified decoded parameters to a platform server; and
   receive the user interface from the platform server.

13. The computer program product as recited in claim 11, wherein the computer-executable instructions that, when executed by a processor, cause the first electronic device to use at least a third portion of the decoded parameters to obtain a user interface comprise computer-executable instructions that, when executed by a processor, cause the first electronic device to:
   request the user interface from the second electronic device; and
   receive the user interface from the second electronic device.

14. The computer program product as recited in claim 10, wherein the computer-executable instructions that, when executed by a processor, cause the first electronic device to activate the input device to capture a context code comprise computer-executable instructions that, when executed by a processor, cause the first electronic device to activate a camera to capture an optically-readable barcode.

15. The computer program product as recited in claim 10, wherein the computer-executable instructions that, when executed by a processor, cause the first electronic device to activate the input device to capture a context code comprise computer-executable instructions that, when executed by a processor, cause the first electronic device to capture a context code using at least one of:
   Near Field Communication (NFC); and
   Radio-Frequency Identification (RFID).

16. The computer program product of claim 10, wherein the second portion of the decoded parameters is configured to initialize the second electronic device into one of a plurality of available states for operation in conjunction with the first electronic device.

17. The computer program product of claim 16, wherein the third portion of the decoded parameters is configured to cause the first electronic device to request and receive the user interface from the second electronic device.

18. The computer program product of claim 16, wherein the third portion of the decoded parameters is configured to cause the first electronic device to request the user interface from a server.

* * * * *